(12) United States Patent
Manni et al.

(10) Patent No.: US 9,046,697 B2
(45) Date of Patent: Jun. 2, 2015

(54) LOW-SPECKLE LIGHT SOURCES AND DISPLAYS EMPLOYING MULTIMODE OPTICAL FIBER

(71) Applicant: JGM Associates, Inc., Burlington, MA (US)

(72) Inventors: Jeffrey G Manni, Burlington, MA (US); Joseph W Goodman, Los Altos, CA (US)

(73) Assignee: JGM ASSOCIATES, INC., Burlington, MA (US)

( * ) Notice: Subject to any disclaimer, the term of this patent is extended or adjusted under 35 U.S.C. 154(b) by 23 days.

(21) Appl. No.: 13/732,053

(22) Filed: Dec. 31, 2012

(65) Prior Publication Data

US 2014/0071406 A1  Mar. 13, 2014

Related U.S. Application Data

(60) Provisional application No. 61/582,488, filed on Jan. 2, 2012, provisional application No. 61/608,086, filed on Mar. 7, 2012.

(51) Int. Cl.
   G03B 21/14    (2006.01)
   G03B 21/20    (2006.01)
   G02B 27/48    (2006.01)

(52) U.S. Cl.
   CPC ............ *G02B 27/48* (2013.01); *G03B 21/2033* (2013.01); *G03B 21/208* (2013.01); *G03B 21/14* (2013.01)

(58) Field of Classification Search
   CPC .... G03B 21/14; G03B 21/20; G03B 21/2006; G03B 21/2013; G03B 21/2033; G03B 21/208; G02B 27/48

USPC .......... 353/31, 85, 94, 69, 122; 362/551, 362/553–554, 556; 348/804; 385/15, 31, 385/39, 49, 115–116, 122–123, 901; 372/6, 372/9; 359/326, 337, 337.2

See application file for complete search history.

(56) References Cited

U.S. PATENT DOCUMENTS 6,347,173 B1 * 2/2002 Suganuma et al. ........... 385/115
6,567,605 B1 * 5/2003 Rice et al. .................... 385/147

(Continued)

OTHER PUBLICATIONS

Jeffrey G. Manni and Joseph W. Goodman, "Versatile method for achieving 1% speckle contrast in large-venue laser projection displays using a stationary multimode optical fiber", May 2, 2012, Optics Express, vol. 20, No. 10, 11288-11315.*

(Continued)

*Primary Examiner* — Jori S Reilly-Diakun
(74) *Attorney, Agent, or Firm* — David G. Grossman

(57) ABSTRACT

An apparatus comprising a laser and/or LED light source(s), multimode optical fiber(s), light coupler(s), an optional spatial light modulator(s), and an optional projection lens(es). The light source has a 1/e half-width emission bandwidth. The light coupler couples the light source to the multimode optical fiber(s) such that objective speckle contrast is reduced. The multimode optical fiber(s) may pass light from the coupler to an optional spatial light modulator. The spatial light modulator may modulate the light to form an image. The projection lens may transfer light onto an image plane or to illuminate objects. The objective speckle contrast at the end of the multimode fiber in combination with the projection lens diameter (if employed) and wavelength diversity may result in viewed images at the viewer's eye, or other detector, exhibiting speckle contrast that may be 1% or less.

33 Claims, 13 Drawing Sheets

(56) References Cited

U.S. PATENT DOCUMENTS

| | | | |
|---|---|---|---|
| 7,447,408 B2* | 11/2008 | Bouma et al. | 385/123 |
| 7,729,574 B2* | 6/2010 | Moriarty | 385/28 |
| 7,864,820 B2* | 1/2011 | Shimotsu | 372/6 |
| 2006/0104582 A1* | 5/2006 | Frampton et al. | 385/123 |
| 2007/0008519 A1* | 1/2007 | Naftali et al. | 356/237.2 |
| 2007/0189338 A1* | 8/2007 | Seelert et al. | 372/6 |
| 2008/0013574 A1* | 1/2008 | Furuya et al. | 372/6 |
| 2009/0168025 A1* | 7/2009 | Domm | 353/20 |
| 2009/0303572 A1* | 12/2009 | Grasser et al. | 359/298 |
| 2010/0053729 A1* | 3/2010 | Tilleman et al. | 359/298 |
| 2010/0079848 A1 | 4/2010 | Grasser et al. | |
| 2010/0253769 A1* | 10/2010 | Coppeta et al. | 348/58 |
| 2011/0134510 A1* | 6/2011 | Lippey et al. | 359/327 |
| 2012/0044464 A1* | 2/2012 | Sqalli et al. | 353/69 |
| 2013/0278907 A1* | 10/2013 | Abele et al. | 353/98 |
| 2014/0185130 A1* | 7/2014 | Arntsen et al. | 359/327 |

OTHER PUBLICATIONS

Trisnadi JI, Speckle contrast reduction in laser projection displays, Proceedings SPIE V4657, 131-137 (2002).

Kohler D, et al., Speckle reduction in pulsed-laser photographs, Optics Communications, V12, No. 1, 24-28 (1974).

Dingel B, Kawata S, Minami S, Speckle reduction with virtual incoherent laser illumination using a modified fiber array, Optik 94: 132 (1993).

Dingel B, Kawata S, Speckle-free image in a laser diode microscope by using the optical feedback effect, Opt. Lett. 18: 549-551 (1993).

Kim J, Kim E, Miller DT, Milner TE, Speckle reduction in OCT with multimode source fiber, Proc. SPIE 5317: 246 (2004).

Parry JP, Shephard JD, Jones JDC, Hand DP, Speckle contrast reduction in a large-core fiber delivering Q-switched pulses for fluid flow measurements, Applied Optics 45: 4209 (2006).

Busker M, Laser Projection: Coupling Optics, Light Management, and Speckle Reduction, (VDM Verlag; 2008), p. 115.

Goodman JW, Speckle Phenomena in Optics: Theory and Applications (Roberts and Company; 2007), p. 244.

Petr Hlubina (1994): Spectral and Dispersion Analysis of Laser Sources and Multimode Fibres Via the Statistics of the Intensity Pattern, Journal of Modern Optics, 41:5, 1001-1014.

R. Dandliker, A. Bertholds, and F. Maystre, "How modal noise in multimode fibers depends on source spectrum and fiber dispersion," J. Lightwave Technol. 3(1), 7-12 (1985).

* cited by examiner

| NA | 0.1 nm | 1 nm | 10 nm |
|---|---|---|---|
| .1 | 3200 | 320 | 32 |
| .2 | 800 | 80 | 8 |
| .4 | 200 | 20 | 2 |
| .6 | 90 | 9 | .9 |
| .8 | 50 | 5 | .5 |

FIG. 2

LOW-SPECKLE LIGHT SOURCES AND DISPLAYS EMPLOYING MULTIMODE OPTICAL FIBER

CROSS-REFERENCE TO RELATED APPLICATIONS

This application claims the benefit of U.S. Provisional Application No. 61/582,488, filed Jan. 2, 2012, entitled "Low-speckle fiber-coupled laser diode arrays for projection displays," and U.S. Provisional Application No. 61/608,086, filed Mar. 7, 2012, entitled "Method for speckle reduction large-venue laser displays," which is hereby incorporated by reference in its entirety.

BRIEF DESCRIPTION OF THE SEVERAL VIEWS OF THE DRAWINGS

FIG. 2 is a table showing calculated lengths of step-index multimode fiber needed to achieve 1% objective speckle contrast at the end of a step-index multimode fiber, assuming various fiber numerical apertures (NAs) and various spectral emission bandwidths for light coupled into the multimode fiber, as per an aspect of an embodiment of the present invention.

DETAILED DESCRIPTION OF EMBODIMENTS

Figure 1:
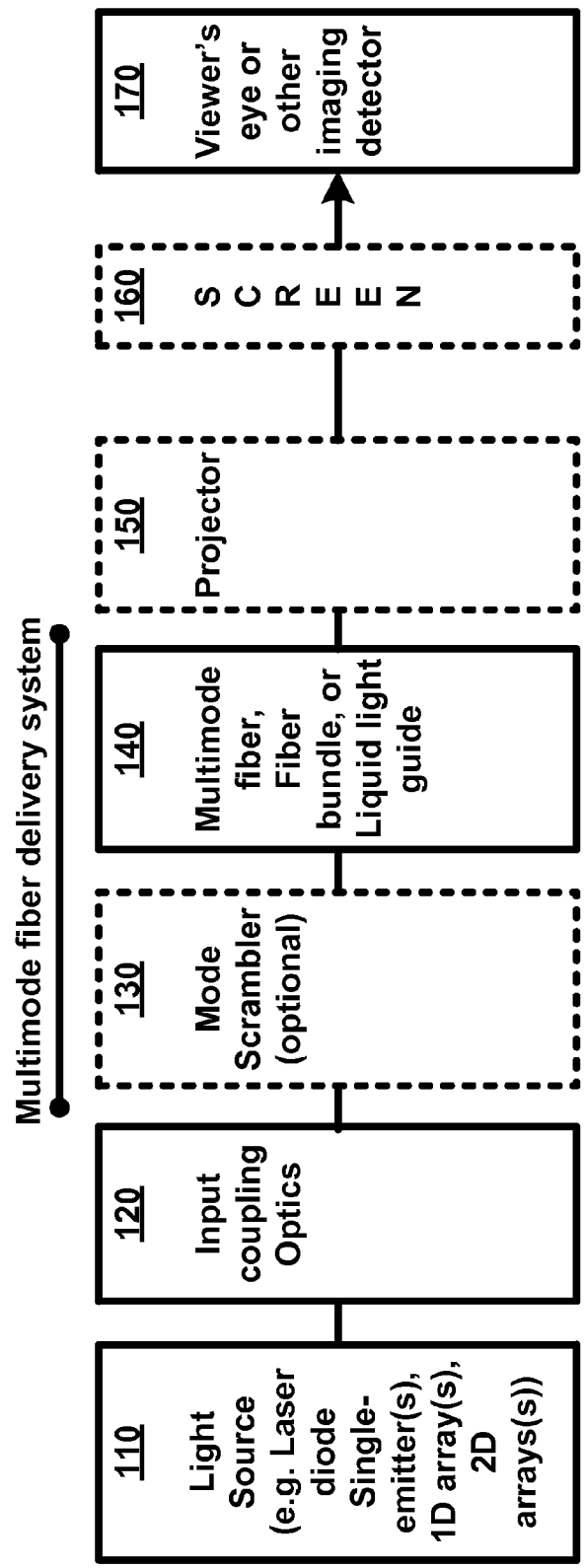
FIG. 1 is a block diagram of an example low-speckle laser projection system as per an aspect of an embodiment of the present invention.

Some embodiments of the present invention enable speckle contrast of 1% or less in viewed images created by a full-frame laser projection display system. Embodiments of the invention may enable speckle contrast ≤1% in viewed images without having to vibrate, rotate, or otherwise physically move any component of the display system. When one is willing to move components in order to achieve speckle reduction, the various embodiments may be applied to reduce the amplitude or magnitude of the physical movement.

Some of the various embodiments employ a stationary multimode optical fiber to achieve the effect of using a rapidly moving diffuser, but without moving the fiber or any other system component. When a suitably large projector lens is used, low-speckle illumination light delivered through the fiber acts in conjunction with wavelength diversity at the projection screen to achieve speckle contrast of 1% or less in viewed images. Some of the various embodiments may be used with most types of high-power visible lasers being considered for large-venue displays. When used with low-cost visible lasers, some embodiments may also be suitable for use in laser-based television.

Speckle is the random modulation of light intensity that occurs when a rough surface, such as a projection screen, is illuminated with coherent or partially coherent light resulting in projected images with a granular appearance. The intensity modulation is a result of random constructive and destructive interference that occurs between light rays from different points on the projection screen as they reach the detector (e.g., the viewer's eye).

Laser speckle may be regarded as spatial noise that degrades information content of laser projected images. It also induces fatigue when viewing speckle-filled images for prolonged periods of time. Applications that tolerate little or no speckle contrast include laser cinema and laser projector-based simulation/training systems.

The numerical value of speckle contrast, C, in a projected image may be given by:

$$C = \frac{[\langle P_i^2 \rangle - \langle P_i \rangle^2]^{0.5}}{\langle P_i \rangle} \quad (1)$$

where $P_i$ is the gray-scale intensity value seen by the $i^{th}$ pixel of the camera or other detector and the < > brackets indicate a spatial averaging operation. Eq. 1 indicates that speckle contrast may be the standard deviation of the pixel intensity divided by the mean value of the intensity. Although some laser projection applications may tolerate speckle contrast values as high as 5%, the most demanding laser projection system developers strive for speckle contrast of 1% and less.

It will be apparent to those skilled in the art that, although low-speckle light source embodiments are described herein in the context of projection displays, other display system embodiments are also possible in which the various low-speckle light source embodiments, which may not include a projection lens, may be used to backlight a liquid-crystal display (LCD) system and/or the like.

It will be additionally apparent to those skilled in the art that low-speckle light sources as described herein in the various embodiments, which may not include a spatial light modulator for creating images, can be realized for general illumination applications in which having low speckle contrast is important. Possible examples include exposure of photoresist during photolithography applications using visible or ultraviolet wavelengths, and illumination of objects or scenes using infrared wavelengths for night-vision applications.

Speckle Reduction Theory

The speckle-reduction factor for a laser projection system, R, is the product of three factors:

$$R = R_\lambda R_\sigma R_\Omega \quad (2)$$

$$C = 1/R \quad (3)$$

In Eq. 2, $R_\lambda$ is the reduction factor due to wavelength diversity, $R_\sigma$ is the factor due to polarization diversity, and $R_\Omega$ the factor due to angle diversity. The speckle contrast value resulting from all speckle-reduction mechanisms combined is $C = 1/R$.

$R_\sigma$, the speckle reduction factor due to polarization diversity, may have values of 1 (no polarization diversity), $\sqrt{2}$, and 2, depending on details of the intended polarization diversification scheme. It is an objective of the various embodiments to enable $R_\Omega R_\lambda$ products/100, so that speckle contrast of 1% or less may be achieved in viewed images even when there is no speckle reduction due to polarization diversity ($R_\sigma = 1$). However, some invention embodiments may still be applied, and typically using a narrower wavelength spectrum and/or shorter length of multimode fiber(s), when $R_\sigma$ is greater than 1.

According to some of the various embodiments, the factor $R_\Omega$ is determined by the combination of the multimode optical fiber(s) used to deliver illumination light and the effective diameter of projector lens(es) used to project images onto a screen or image plane, among other factors. The term projector lens or projector lens(es) may refer to a single lens or a lens combination. We describe in detail below how the value of this $R_\Omega$ factor is determined considering the various aspects of embodiments of the invention.

The speckle reduction factor due to wavelength diversity, $R_\lambda$, is:

$$R_\lambda = [\Delta\lambda/\delta\lambda]^{0.5}, \; \delta\lambda = \lambda^2/(2\Delta d) \quad (4)$$

where $\lambda$ is the laser wavelength, $\Delta\lambda$ is the laser's spectral bandwidth, and $\Delta d$ is the average surface-profile height variation of the projection screen. Height variations may be assumed to be larger than $\lambda$ such that the screen-scattered fields obey circular Gaussian statistics. The $2\Delta d$ factor applies to reflection-mode screens. Equation 4 involves the ratio of $2\Delta d$ to the coherence length of the light source, $L_c$, and may be rewritten as:

$$R_\lambda = [2\Delta d/L_c]^{0.5} [N_{eff}]^{0.5}, \; L_c = \lambda^2/\Delta\lambda \quad (5)$$

Speckle contrast may reduce as $1/\sqrt{N}$ where N is the number of incoherent and uncorrelated emitters (of equal intensity) having their light combined at the detector. One way to interpret Eq. 5 is that $R_\lambda$ is equal to the square-root of some effective number of emitters, $N_{eff}$, determined by the statistical distance spread induced by screen roughness divided by coherence length of the light source.

According to embodiments of the invention, low speckle contrast may be achieved at the end of a highly multimode optical fiber by relying on intermodal dispersion to induce a statistical spread in distances through the fiber that is many times longer than the coherence length of the light being delivered. However, as we describe later, the use of a multimode fiber in this manner may determine the $R_\Omega$ factor in Eq. 2, and not $R_\lambda$.

The various embodiments of the invention inject spectrally broadened light into a multimode fiber as needed to achieve $R_\Omega R_\lambda$ products that may be greater than or equal to 100 so that the fiber-delivered light may be used to create viewed images with 1% speckle contrast or better, and without having to rely on polarization diversity.

Speckle Reduction for Cinematic Laser Displays

Laser projection displays may include full-frame, scanned-line, and scanned point (raster-scan) projectors. Although they may prove useful for all types, some embodiments of the invention may be particularly useful as a speckle reduction mechanism that may be applied in practical fashion with full-frame image projectors as are commonly used in movie theaters. The mechanism may be used, for example, with projectors that employ lasers as a direct replacement for filtered arc-lamp light sources. Present lamp-based cinema projectors accommodate numerical apertures as large as 0.8 or 0.9 for illumination light, but, to improve projector efficiency and dark/light contrast ratio, numerical apertures in the range of 0.2 to 0.4 may be desired in the future [10].

Lasers being considered for laser cinema and related applications included high-power (10 W and more) continuous-wave lasers, including fiber lasers, laser diodes, and laser diode arrays, nanosecond-pulse lasers, picosecond-pulse, and sub-picosecond (e.g., 100 femtosecond) pulse lasers.

GENERAL DESCRIPTION

Some of the various embodiments may reduce speckle contrast to 1% or less in projected images, and preferably without relying on moving fibers, diffusers, screens or other moving components in the projection system. Additionally, embodiments may achieve 1% contrast without relying on polarization diversity. In other words, embodiments may seek $R_\lambda R_\Omega$ products in Eq. 2 of 100 and larger. It may be that 1% or less speckle contrast may be achieved for each color channel used in the display system so that speckle contrast remains negligible even when monochrome images are being displayed. In general, projection systems include a red-wavelength, a green-wavelength, and a blue-wavelength color channel, but they may include alternatively, or in addition, a cyan-, a magenta-, and/or a yellow-wavelength color channel. So-called "6-primary" (two red wavelengths, two green wavelengths, and two blue wavelengths), and related schemes intended for some types of three-dimensional displays, may include more than one wavelength in each color channel. In the most general case, de-speckling measures as described in the various embodiments may be required at each distinct wavelength used in the display system.

A basic strategy for achieving projected images having speckle contrast of 1% or less includes delivering low-speckle laser illumination light to the image projector through a highly multimode optical fiber, or a plurality of multimode optical fibers, for each color channel of the projector. The multimode fiber(s) may be configured considering details of the laser light spectrum injected into the fiber(s), the effective diameter of the projection lens or lens combination used in the projector, and the effective roughness of the screen used to display projected images, among other factors described below.

FIG. 1 is a block diagram that shows aspects of embodiments of the present invention employing a low-speckle laser light source in the context of using semiconductor laser diodes (laser diodes) to generate light for a projection display system. Emission from one or more lasers 110 may be coupled 120 into the proximal end of a multimode optical fiber 140. If the light spectrum is broad enough, and the multimode fiber 140 is designed and configured properly, then light delivered at the fiber's distal end may have low "objective" speckle contrast (speckle with a contrast value that is independent of the viewer's eye or other detector). An optional mode scrambler 130 may be placed near the input end of the fiber to better equalize power distribution among modes of the multimode fiber 140, thereby reducing the fiber length needed to achieve a desired objective speckle contrast at the end of the fiber. Light delivered by the multimode fiber may be employed as an illumination source in a projector 150 in a projection display system that may project 2D (or 3D-capable) images onto a projection screen 160 with magnification.

Laser diode sources 110 may include edge-emitter lasers, vertical-cavity surface-emitters (VCSELs), vertical external-cavity surface-emitter lasers (VECSELs), and/or the like. Such lasers may be employed as single-emitter devices, 1D array "bars", 2D laser diode arrays (including 2D bar stacks and monolithic 2D arrays of surface-emitter lasers), and/or the like. However, as will be discussed later, non-laser-diode light sources may also be used.

Light may be coupled into the multimode optical fiber 140 using any of several possible mechanisms, including focusing of a single light beam into the fiber, or focusing of multiple beams into a single multimode fiber using angle- or geometric multiplexing, fiber-array multiplexing, wavelength-beam-combining, and/or the like.

Multimode fibers 140 may include conventional step-index fibers, gradient-index (GRIN) silica fibers, photonic crystal fibers, photonic bandgap fibers, specialty optical fibers that employ materials other than silica glass, and/or the like. Multimode fibers may have different core cross-sectional shapes, such as a round core cross-section, a square core cross-section, a rectangular core cross-section, octagonal core cross-section, and/or the like. Multimode optical fibers having a rectangular core with aspect ratio of 16:9 may be particularly useful for illuminating conventional imaging devices used in projectors with improved light efficiency. Some embodiments employ a single-core multimode fiber, however, those skilled in the art will recognize that other light guides may be employed such as a fiber bundle, liquid light guide, and/or the like.

Some of the various embodiments may employ a full-frame 2D or 3D-capable projector 150 that may include an imaging light-valve device such as a digital minor device, liquid-crystal-on-silicon chip, and or the like. Devices such as a line-scan or raster-scan projector might also be used in some situations. The projector may include a lens or lens combination (projector lens) that transfers images created by the spatial light modulator onto an image plane or screen. The diameter of this projector lens or lens combination plays a role in determining the speckle contrast exhibited in viewed images.

A spatial light modulator may not be employed at all if the intent is to generate low-speckle light to illuminate an object or scene for the purposes of creating or recording an image of such objects or scene. In this case, a lens or lens combination may be used to transfer illumination light onto the object or scene to be imaged. The diameter of the lens or lens combination plays a role in determining speckle contrast exhibited in the resulting images.

The projection screen 160 may be a reflection-mode, surface-scattering, stationary screen. Other screens that may be used include transmission screens, volume-scattering screens, screens that may be vibrated or otherwise moved, and/or the like. The screen or other object being illuminated induces a statistical spread of distances by which light reaches the imaging detector, and, along with wavelength diversity associated with emission bandwidth of the light source, also plays a role in determining speckle contrast in resulting images.

The low-speckle light source embodiments described herein may also be used to configure backlight units (BLUs) for liquid crystal displays (LCDs), and/or the like, that achieve very low speckle contrast by virtue of using multimode optical fiber(s) between the light source(s) and the BLU. In this case, the statistical spread of distances induced by the BLU, by which light travels from the light sources to a given point on the LCD panel, acts in conjunction with objective speckle reduction in the multimode fibers and wavelength diversity associated with light source emission bandwidth, to achieve LCD images with very low speckle contrast.

The system detector 170 may comprise the retina and pupil of the viewer's eye, or a suitable electronic camera/detector equipped with an imaging lens that is separate from the projector lens. In low-speckle general illumination applications of the various embodiments, this detector may be absent altogether, or may take the form of a photo-sensitive chemical layer (photoresist) as in photolithography applications.

Various aspects of the embodiments may achieve objective speckle contrast in the range of <1% to 20% at the end of the multimode delivery fiber by designing the fiber according to the injected light spectrum. Considering typical large-venue display parameters, this might allow $R_\Omega$ values in the range of 5 to 135, depending on the diameter of the projection lens. For example, and as will be discussed below, a "K value" of $(137)^2=18,800$ may be achieved when using a 100 mm diameter projector lens (see Eq. 22-24 below). If speckle contrast at the end of the fiber is 0.7% or less, then it may be possible to achieve $R_\Omega>100$, and speckle contrast of 1% in the viewed image, without relying on wavelength diversity at all (i.e., with $R_\lambda=1$).

However, when $R_\Omega$ is less than 100, and perhaps as low as 5 (corresponding to 20% objective speckle contrast at the end of the multimode fiber), it may in some instances be possible to use the wavelength diversity aspect of some embodiments to achieve $R_\lambda>20$ such that the product $R_\lambda R_\Omega$ is greater than 100. Speckle contrast of 1% or less in viewed or recorded images may then still be achievable.

Compatibility with Laser Projection Displays

Characteristics of laser-based and some high-performance light-emitting-diode-(LED)-based light sources for display applications may include high color saturation, very wide color gamut, low etendue (better light collimation for improved projector efficiency and higher dark/light contrast ratio), ability to adjust and stabilize color balance, and polarized or unpolarized emission, as needed. Some of the various speckle reduction embodiments may preserve these characteristics, but with some caveats.

Existing lamp-based projectors may accommodate numerical apertures (NAs) as large as 0.8 (large etendue), but, there is interest to reduce light source NA as a way to improve projector efficiency and dark/light contrast ratio. Therefore, when employing some of the embodiments, one may desire to employ multimode fibers with NAs of 0.4 or less.

Delivery of polarized laser light through a length of standard multimode fiber may depolarize the light, but, considering that present lamp-based projectors do not employ polarized light sources, this may not be a liability. Liquid-crystal on silicon (LCoS) projectors usually require plane-polarized light, but projectors based on Texas Instruments' digital-mirror (DLP$^{tm}$) imaging chip or Silicon Light Machines' Grating Light Valve (GLV$^{tm}$) may not. When polarized light is needed, delivery of light through a small-core multimode fiber, as disclosed, may enable new and efficient polarization-recovery schemes at the delivery end of the multimode fiber that may be compatible with existing projector designs. Alternatively, one might use a polarization-maintaining highly multimode fiber if and when such fibers become available.

Considering the above caveats, expected characteristics of the proposed speckle-reduction mechanism for large-venue projection display applications may include: a potential for reducing speckle contrast below 1% with simple hardware; preservation of desirable features of using lasers; no moving parts; compact and robust (the multimode fiber may be coiled, 10 to 20 cm coil diameter); low cost (multimode fiber is inexpensive, even when properly terminated); compatibility with existing projectors; compatibility with high laser power delivery; and fiber optic delivery enabling light source placement outside the projection room. Many of these same features may be attractive for display system applications other than large-venue projection displays and for general low-speckle illumination applications.

Multimode Fiber Technology

According to some of the various embodiments, speckle contrast at the end of the multimode fiber may be reduced by exploiting intermodal dispersion in a multimode optical fiber, including one of a length much shorter than the fiber's "mode-coupling length" such that little or no redistribution of power among fiber modes occurs. Present fibers may exhibit transmission losses of 10 to 15 dB/km at green wavelengths, somewhat higher losses at blue wavelengths, and lower losses at red wavelengths. A 100 meter-long fiber with 15 dB/km loss may transmit only 70%, and one with 10 dB/km loss may transmit 80%. While such transmission efficiencies may be tolerable, they may not be desirable considering the relatively high laser power levels involved in large-venue projectors. Some of the embodiments of the present invention may achieve 1% speckle contrast using 30 meters of fiber or less, and, ideally, less than 3 meters. Transmission efficiency through the multimode fiber may then be 90% or better not considering Fresnel reflection losses at the fiber end facets (which may be eliminated using anti-reflection coatings on properly terminated fibers).

Glass-clad silica fibers have longer mode coupling lengths (see below) and may be easier to use at higher power levels than hard polymer-clad (hard-clad) silica fibers. However, at present, glass-clad silica fibers may have numerical apertures of 0.22 or less, whereas hard-clad silica fibers achieve NAs as large as 0.47. Both types of fibers may be used successfully according to some of the various embodiments. All-glass "photonic crystal" fibers that achieve NAs as large as 0.65 at visible wavelengths appear to be feasible.

Intermodal Dispersion in Multimode Fibers

Dispersion mechanisms that operate in multimode optical fibers include material, waveguide, and intermodal dispersion. Intermodal dispersion may be capable of achieving <1% objective speckle contrast at the end of the fiber considering spectra of available laser light sources. Intermodal dispersion may be substantially larger in step-index fibers than in gradient-index (GRIN) fibers. GRIN fibers may be employed practically if spectral bandwidth of the light source is large enough.

Intermodal dispersion (or modal dispersion) in a step-index multimode fiber may result in temporal pulse spreading as given by [12]:

$$\delta \tau = \frac{n_1 L \Delta}{c}; \Delta \equiv \frac{(n_1 - n_2)}{n_1} \tag{6}$$

where $\delta \tau$ is the time difference between the earliest- and latest-to-arrive portions of the light delivered through the fiber, L is the length of multimode fiber, $n_1$ ($n_2$) is the refractive index of the fiber core (cladding), $\Delta$ is the fractional difference in refractive index, and c is the speed of light in vacuum. Since fiber NA=$n_1(2\Delta)^{0.5}$, Eq. 6 may be rewritten in an easier-to-use form:

$$dt = \frac{L(NA)^2}{2n_1 c} \tag{7}$$

Equation 7 indicates that pulse (temporal) spreading in a step-index fiber is proportional to fiber length and the square of fiber NA. As an example, a 0.2 NA fiber (nominal index of 1.5) may exhibit temporal spreading of 0.44 ps per cm of fiber length, or 44 ps per meter of fiber. Equation 7 may apply if the length of step-index fiber being used is much shorter than the fiber's "mode coupling length", $L_c$. For fiber lengths much longer than $L_c$, such that mode mixing establishes an equilibrium power distribution among fiber modes, temporal spreading due to modal dispersion may then scale with the square root of fiber length, according to:

$$\delta \tau = \frac{(NA)^2 \sqrt{L L_c}}{2 n_1 c} \tag{8}$$

Therefore, to minimize transmission losses and otherwise maintain a manageable length for the multimode delivery fiber, the fiber used according to some of the various embodiments may be (much) shorter than its corresponding mode coupling length.

Mode coupling length may be inversely proportional to the fiber's mode coupling coefficient which may depend on details of the fiber's design and manufacturing process. This coefficient may be determined by fiber flaws introduced during manufacturing, including impurities, inhomogeneities, microbends, core-cladding irregularities, refractive index fluctuations, and/or the like. The mode coupling coefficient may scale in proportion to $\lambda^2$ and inverse proportion to the square of the fiber core radius, $a^2$.

Silica fibers with core sizes in the 50- to 500-micron range may be capable of handling high laser power levels while providing good flexibility for coiling. Hard-clad silica-core fibers may have numerical apertures as high as 0.47 and may have mode coupling lengths longer than 500 meters. Glass-clad silica fibers may have NAs of 0.11 to 0.22 and mode coupling lengths longer than 1 kilometer. Accordingly, Eq. 7 may apply for glass-clad and hard-clad multimode fiber lengths as long as 100 meters. Plastic-core optical fibers (POF) may have very short mode coupling lengths on the order of 10 meters, and may not reliably handle high laser power levels.

Equation 7 indicates that modal dispersion may depend on fiber length and NA, but, to a first approximation, not on fiber core size (if fiber length is much shorter than mode coupling length). This situation may provide freedom to increase fiber core size as needed to prevent unwanted nonlinear effects in the multimode fiber, or to prevent fiber damage at high power levels. Nonlinear effects and laser-induced damage may be important considerations when high-peak-power pulsed laser emission is involved, but may be less of an issue when broadband and continuous-wave laser emission is being delivered through the multimode fiber.

Equations 7 and 8 refer to the maximum time delay through fiber, i.e., time delay between the first-to-arrive and last-to-arrive light, and assume launch conditions that fill the fiber NA. In general, the average time delay, which considers the specific distribution of power among modes of the multimode fiber, may be less. Therefore, Eq. 7 may provide an estimate of the shortest length of multimode fiber needed to achieve the desired speckle contrast at the end of the fiber. Actual required fiber lengths may depend on average time delay and may be longer.

The average time delay may be determined by the so-called "impulse response" of the multimode fiber, which, in turn, may depend on fiber NA, fiber length, and, for fiber lengths much shorter than the mode coupling length, on launch conditions. Impulse response may also depend on how tightly the fiber is coiled. The actual impulse response of a given multimode fiber configuration may be measured, and, in some cases, it may be possible to model the actual impulse response with reasonable accuracy.

Gradient index (GRIN) silica glass multimode optical fibers may also be used with advantage in some embodiments of the invention, especially when the light source spectrum bandwidth is large. GRIN fibers may exhibit intermodal dispersion that is much less, and perhaps by a factor of 10 to 100 or more, than intermodal dispersion in step-index silica glass fibers.

Considering that delivery of light through a multimode fiber may result in a statistical spread of path lengths by which light reaches the end of the fiber, one might reasonably expect that speckle contrast at the end of the fiber is reduced in a fashion similar to that indicated in Eq. 5. This in fact happens, and an analysis of the expected contrast reduction is presented.

Quantitative Analysis of Objective Speckle Contrast at Distal Fiber End

To make a quantitative assessment of the expected objective speckle contrast value at the end of the multimode fiber (or plurality of multimode fibers in some embodiments), an analytical framework is desired that considers detailed shapes of light-source spectra and fiber impulse response functions. This analytical framework may address arbitrary real-world shapes as well as ideal shapes commonly used in theoretical analyses (Gaussian, Lorentzian, etc). Such a framework has been employed to analyze "modal noise" in optical telecommunications links that employ multimode fibers.

Given the light source's power-density spectrum, $P(v)$, and the fiber's impulse response function, $h(t)$, speckle contrast at the output end of the multimode fiber may be given by:

$$\text{Contrast} = \gamma, \ \gamma^2 = \int dv \ C_p(v) |\hat{h}(v)|^2 = \int dv \ C_p(v) \hat{C}_h(v) \quad (9)$$

where $C_p(v)$ is the normalized autocorrelation function of the power density spectrum, $$C_p(v) = \frac{\int dv' P(v') P(v'-v)}{\langle I \rangle^2}, \ \int dv \ C_p(v) = 1 \quad (10)$$

$\hat{h}(v)$ is the Fourier transform of the (normalized) impulse response function, which is also known as the incoherent transfer function of the multimode fiber, $$\hat{h}(v) = \int dt \, h(t) e^{-i2\pi vt}, \ \int dt \, h(t) = 1 \quad (11)$$

and $\hat{C}_h(v)$ is the Fourier transform of the autocorrelation of $h(t)$ $$\hat{C}_h(v) = \int dt \, e^{-i2\pi vt} \int dt' \, h(t') h(t'-t) \quad (12)$$

In Eq. 10, $\langle I \rangle$ is the total ensemble average intensity summed over all fiber modes and all wavelengths. The main assumptions made in deriving Eq. 9 may be that (a) the modal dispersion constant of the fiber does not vary significantly over the range of wavelengths being delivered through the fiber, and (b) that the number of fiber modes is very large.

Equation 9 may provide a quantitative result for the expected objective speckle contrast at the end of the multimode fiber. The formalism may be used given arbitrary shapes for the light spectrum and impulse response function of the fiber. The light spectrum and fiber impulse response may be measured, digitized, and processed numerically on a computer to arrive at the speckle contrast value indicated by Eq. 9. It may also be possible to model the impulse response function of the multimode fiber length, and then numerically calculate speckle contrast.

In the discussions below, Eqs. 9-12 may be applied assuming somewhat idealized spectral profiles as may apply to laser spectra of interest so that closed-form analytical expressions may be obtained for objective speckle contrast at the end of the fiber.

Source with a Gaussian Spectrum

The formalism of Eqs. 9-12 may first be used to calculate objective speckle contrast at the end of the multimode fiber when the light source spectrum has a Gaussian spectral profile with center wavelength $\lambda$ and $1/e$ half-width, $\Delta v$, and when the spectrum has no sub-structure. It is assumed that the fiber's impulse response function does not change shape with fiber length and that width of the impulse response function increases linearly with fiber length. Speckle contrast at the end of the multimode fiber may then be given by:

$$C(L)^2 = \left[1 + \frac{1}{2}(2\pi\Delta v)^2 T_g'^2\right]^{-1/2}; \quad (13)$$

$$|\Delta v| = \frac{c}{\lambda^2} \cdot \Delta\lambda; \ T_g' \equiv \frac{\delta\tau}{\sqrt{3}}$$

where $\delta\tau$ is the value from Eq. 7. Note that the definition of $T_g'$ may account for the fact that the average time delay through the fiber is less than $\delta\tau$, which is the maximum time difference between first-to-arrive and last-to-arrive light. The derivation of this equation assumes that the fiber's (magnitude squared) incoherent transfer function is a $\sin c^2(\omega\delta\tau/2)$ function, which may be approximated as $\exp-(\omega T_g'/2)^2$. Actual objective speckle contrast at the end of the fiber may depend on the details of the shape of the fiber's impulse response function, and the corresponding average time delay through the fiber, which, in general, will result in a different value for $T_g'$ than that assumed in this discussion.

In cases of interest, the second term in brackets in Eq. 13 may typically be much greater than 1, so that $C(L)^2$ scales inversely with fiber length L and contrast C(L) scales inversely with $L^{1/2}$. Note that, for a long enough fiber such that the second term in Eq. 13 may dominate, objective contrast at the end of the fiber may be determined by the spread in distances through the fiber induced by intermodal dispersion ($cT'_g$) divided by coherence length of the injected light ($\lambda^2/\Delta\lambda$).

FIG. 2 is a table showing calculated lengths of step-index multimode fiber needed to achieve 1% objective speckle contrast at the end of the fiber given values of spectral bandwidth and fiber NA, and assuming a true Gaussian spectrum with a center wavelength of 500 nm. The calculated fiber lengths are in meters. The values in the table may apply when the Gaussian spectrum has no sub-structure, or when the spectrum has "unresolvable" substructure with features much smaller in frequency/wavelength space than the width of the fiber's incoherent transfer function. For a fiber length of 10 meters, and fiber NA=0.22, the minimum resolvable element may be about $10^{-3}$ nm (1 pm) at a wavelength of 500 nm. If, in this case, the light spectrum consists of many narrow lines spaced by 1 pm or less, but the envelope function that describes the relative intensities of the lines is a Gaussian, then Eq. 13 and the table in FIG. 2 may be applied directly.

Figure 3:
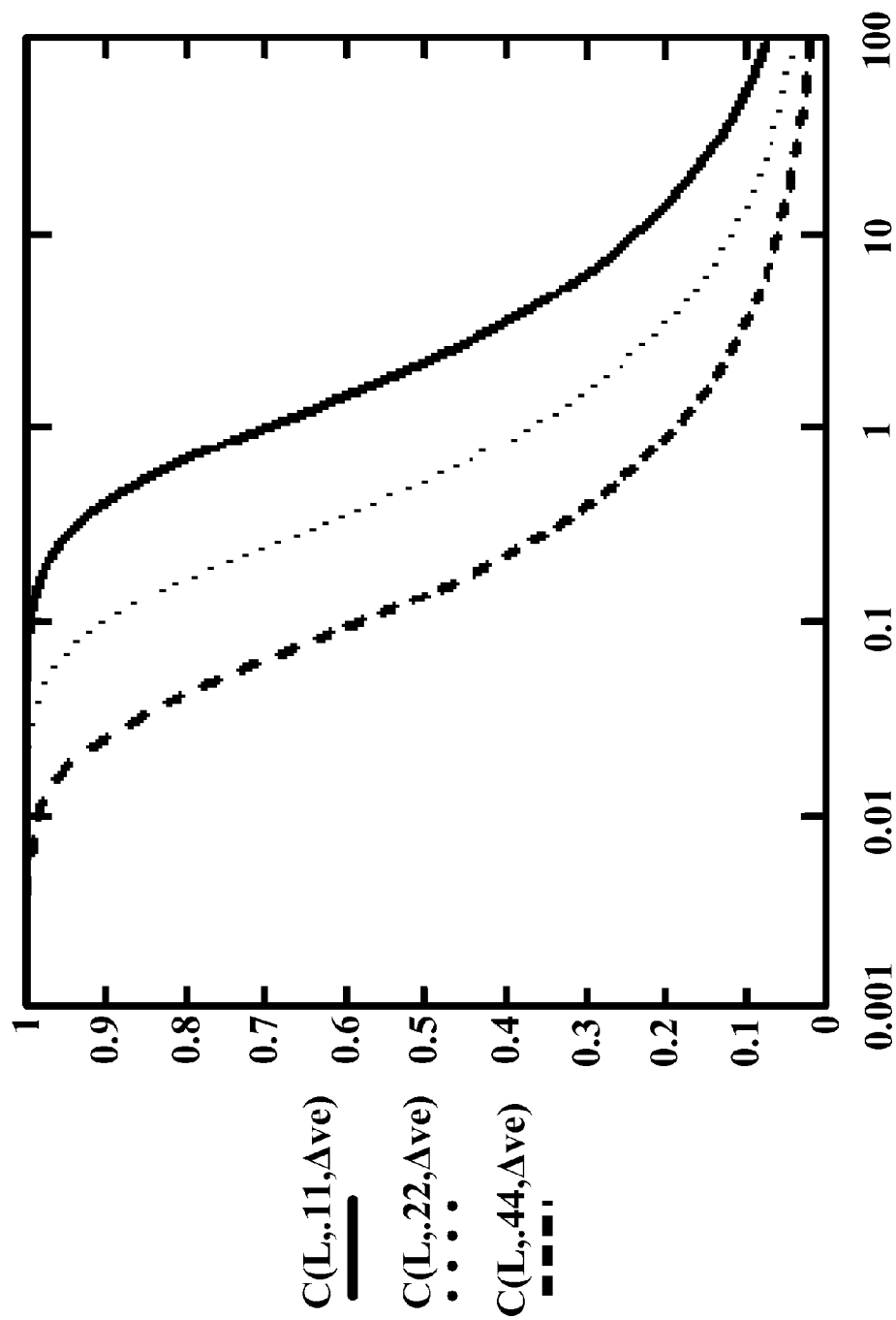
FIG. 3 is a graph showing objective speckle contrast decreasing monotonically with fiber length as per an aspect of an embodiment of the present invention, assuming a light source spectrum having a Gaussian profile with no substructure.

FIG. 3 is a graph showing that speckle contrast decreases monotonically with fiber length when the light source has a Gaussian-profile spectrum with no significant substructure. FIG. 3 shows speckle contrast, C(L), versus fiber length for fiber NAs of 0.11 (solid), 0.22 (dotted), and 0.44 (dashed), assuming a Gaussian spectral profile with 1/e half-width=1.0 nm. Fiber length is in meters and is shown on a log scale.

Speckle Contrast with "Rippled" Emission Spectra

While many laser and non-laser light sources have a near-Gaussian spectral profile, it is often the case that spectra have some "ripple" or modulation that makes the spectral profile deviate from a true Gaussian shape. The formalism of Eqs. 9-12 provides the means to quantify the expected change in objective speckle contrast for an arbitrary spectral profile. For example, the detailed spectral profile and impulse response of the fiber may be digitized and speckle contrast calculated by doing the indicated integrations numerically on a computer.

Speckle Contrast with Multi-Line Spectra

The case of a multi-line (or multimode) spectrum has been addressed in the literature to achieve a closed-form analytical expression for objective speckle contrast at the end of a multimode fiber. In the expression that follows, C(L) is the speckle contrast at the end of a multimode fiber of length, L. The individual lines in the spectrum may be assumed to have Gaussian profiles with 1/e half-widths=$\Delta v$, center-to-center spacing between lines=$\Delta v_s$, and a Gaussian envelope function with 1/e half-width=$\Delta v_e$. The number of discrete modes in the spectrum is N, and the indicated sums may be taken from $-(N-1)/2$ to $+(N-1)/2$. This equation may be evaluated on a computer using software such as Mathcad.

$$C^2(L) = \qquad (14)$$

$$\left[1 + \frac{1}{2}(2\pi\Delta v T'_g)^2\right]^{-1/2} \frac{\sum_m \sum_n \exp\left(-\frac{(m^2+n^2)\Delta v_s^2}{\Delta v_e^2}\right)\exp\left\{-\left(\frac{(m-n)\Delta v_s}{2^{1/2}\Delta v}\right)^2\left\{1-\left[1+\frac{1}{2}(2\pi\Delta v T'_g)^2\right]^{-1}\right\}\right\}}{\sum_m \sum_n \exp\left(-\frac{(m^2+n^2)\Delta v_s^2}{\Delta v_e^2}\right)}$$

Using the relation $\Delta\lambda=\lambda^2\Delta v/c$, Eq. 14 may be transformed into a more applicable form for the present embodiments:

$$C^2(L) = \left[1 + \frac{1}{2}\left(2\pi c\frac{\Delta\lambda}{\lambda^2}T'_g\right)^2\right]^{-1/2} \qquad (15)$$

$$\frac{\sum_m \sum_n \exp\left(-\frac{(m^2+n^2)\Delta\lambda_s^2}{\Delta\lambda_e^2}\right)\exp\left\{-\left(\frac{(m-n)\Delta\lambda_s}{2^{1/2}\Delta\lambda}\right)^2\left\{1-\left[1+\frac{1}{2}\left(2\pi c\frac{\Delta\lambda}{\lambda^2}T'_g\right)^2\right]^{-1}\right\}\right\}}{\sum_m \sum_n \exp\left(-\frac{(m^2+n^2)\Delta\lambda_s^2}{\Delta\lambda_e^2}\right)}$$

Equation 15 is general and thus very useful. The number of modes N may be adjusted independently of other parameters, and, in particular, independently of $\Delta\lambda_e$. The ratio of the individual linewidths to the line spacing, $\Delta\lambda/\Delta\lambda_s$, may also be adjusted to any value. Many different types of laser spectra encountered in practice may be modeled as a result.

It was shown earlier that speckle contrast decreases monotonically with fiber length when the source spectrum has a Gaussian profile and no substructure. In the multi-line case of Eq. 15, and when the spectral linewidth, $\Delta\lambda$, is much smaller than the line spacing, $\Delta\lambda_s$, a more complicated "S-shaped" curve describes how speckle contrast decreases with fiber length.

Figure 4:
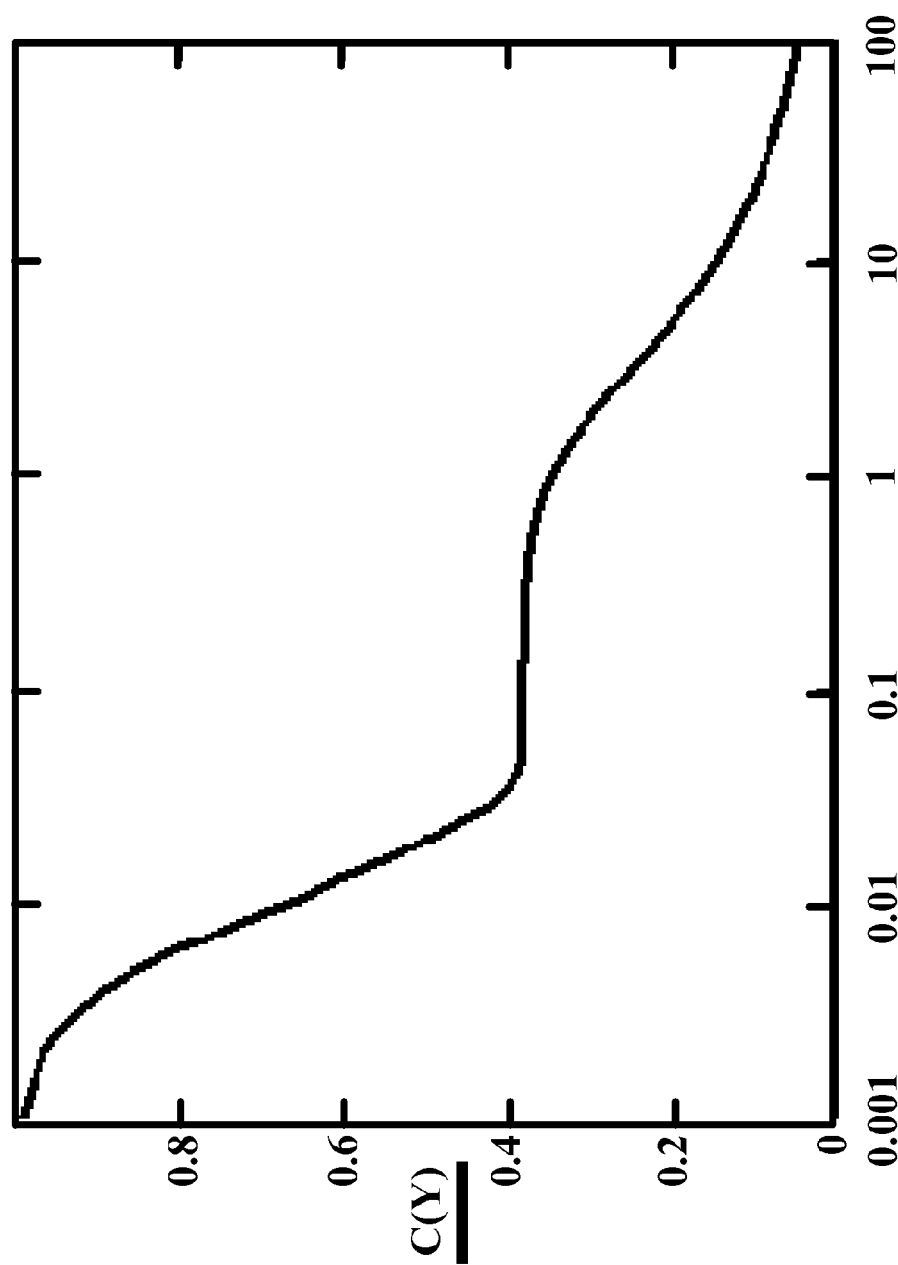
FIG. 4 is a graph showing objective speckle contrast as a function of $Y=(2\pi\Delta\nu NA^2 L)/(2\sqrt{3}n_1 c)$ as per an aspect of an embodiment of the present invention, assuming a light source spectrum having a Gaussian envelope function and multi-line substructure.

FIG. 4 is a graph showing speckle contrast as a function of $Y=(2\pi\Delta v NA^2 L)/(2\sqrt{3}n_1 c)$ when the source spectrum has a multi-line structure with linewidth, $\Delta\lambda$, that is much smaller than the line spacing, $\Delta\lambda_s$. In FIG. 4, $Y=2\pi\Delta v T'_g=(2\pi\Delta v \cdot LNA^2)/(2\sqrt{3}n_1 c)$ and is plotted on a log scale. An S-shaped curve applies as L is increased. Instead of decreasing monotonically, speckle contrast exhibits a "plateau region" in which speckle contrast remains constant as fiber length is increased. The presence of the plateau region may increase the length of fiber needed to achieve a desired objective speckle contrast value for a given combination of $\Delta v$ and fiber NA values.

The curve in FIG. 4 is a direct result of application of Eqs. 9-12. The Fourier transform of the multimode fiber's impulse response function (i.e., its incoherent transfer function) gets narrower in frequency or wavelength space as fiber length increases. The autocorrelation of the multi-line source spectrum is another multi-line spectrum with features similar to that of the source spectrum. So, when the (magnitude squared) incoherent transfer function is multiplied by the autocorrelation function of the source spectrum, and integrated as indicated in Eq. 9, the result is different depending on which of three different operating regimes applies, as discussed below.

In Regime I, the fiber's (magnitude squared) incoherent transfer function is much wider than the frequency/wavelength spacing between spectral lines of the source spectrum, and Y is much less than 1. Eq. 15 reduces to:

$$C_I^2(L) \approx \left[1 + \frac{1}{2}(2\pi\Delta v_e)^2 T'^2_g\right]^{-1/2}; \qquad (16)$$

$$\Delta v_e = \frac{c}{\lambda^2} \cdot \Delta\lambda_e; \; T'_g \equiv \frac{L \cdot NA^2}{\sqrt{3} \cdot 2 \cdot n_1 c}$$

which is the same as Eq. 13 but with $\Delta v$ replaced by $\Delta v_e$. Speckle contrast decreases with fiber length according to the width of spectrum's envelope function, ignoring spectral substructure.

In Regime II, or the "plateau region", the fiber's incoherent transfer function is less than the frequency spacing between spectral lines, $\Delta\lambda_s$, but wider than the individual linewidths, $\Delta\lambda$. When the integration in Eq. 9 is performed, the incoherent transfer function may "pick out" the centermost peak (at $\omega$ shift=0) of the autocorrelation function of the power density spectrum, which means that m=n in Eq. 15. In this regime, Eq. 15 reduces to:

$$C_{II}^2 \approx \frac{\sum_m \exp\left(-\frac{2m^2 \Delta\lambda_s^2}{\Delta\lambda_e^2}\right)}{\sum_m \sum_n \exp\left(-\frac{(m^2+n^2)\Delta\lambda_s^2}{\Delta\lambda_e^2}\right)} \text{(Regime II; plateau region)} \quad (17)$$

When the number of equally spaced modes in the spectrum, N, is large enough that they span a total range about 25% larger than $2\Delta\lambda_e$ (or larger), then Eq. 17 may be approximated as $$C_{II}^2 \approx \frac{1}{(2\pi)^{1/2}} \frac{\Delta\lambda_s}{\Delta\lambda_e} \equiv \frac{1}{N_{\textit{eff}}} \quad (18)$$

where $N_{\textit{eff}}$ is $(2\pi)^{1/2}$ times the number of modes contained within the 1/e half-width of the Gaussian envelope function.

For arbitrary relative power levels of the individual modes, $P_n$, (arbitrary envelope function), speckle contrast in Regime II may be given by:

$$C_{II}^2 = \frac{\sum_n P_n^2}{\left(\sum_n P_n\right)^2} \quad (19)$$

For N modes having equal power, $C_{II}(L)=1/\sqrt{N}$ as expected. If the modes are not spaced equally, then, for Eq. 19 to apply strictly, the fiber may have to be long enough that the incoherent transfer function is narrower than the smallest mode spacing in the spectrum. When in the plateau region, objective speckle contrast at the end of the fiber may be no less than $1/\sqrt{N_{\textit{eff}}}$. If only 100 modes appear in the spectrum, speckle contrast may be no better than 0.10 (10%) and this value applies only if all modes have equal power.

In Regime III, the (squared magnitude of the) fiber's incoherent transfer function is narrower than the widths of the individual lines in the multi-line spectrum, $\Delta v$ (or $\Delta\lambda$). Speckle contrast may be reduced from that in Regime II, as indicated in Eq. 20, and may be reduced to 1% or less using an adequately long fiber:

$$C_{III}^2(L) \approx C_{II}^2 \left[1 + \frac{1}{2}(2\pi\Delta v)^2 T_g'^2\right]^{-1/2} \quad (20)$$

$$\Delta v = \frac{c}{\lambda^2} \cdot \Delta\lambda;$$

$$T_g' \equiv \frac{L \cdot NA^2}{\sqrt{3} \cdot 2 \cdot n_1 c}$$

In general, it may be desirable to eliminate the plateau region of Regime II so speckle contrast decreases monotonically with length, thereby minimizing the fiber length needed to achieve a desired speckle contrast. This situation may be achieved when the ratio $\Delta\lambda/\Delta\lambda_s/0.25$, and this is true regardless of the value of the ratio $\Delta\lambda_s$, $\Delta\lambda_e$.

Figure 5:
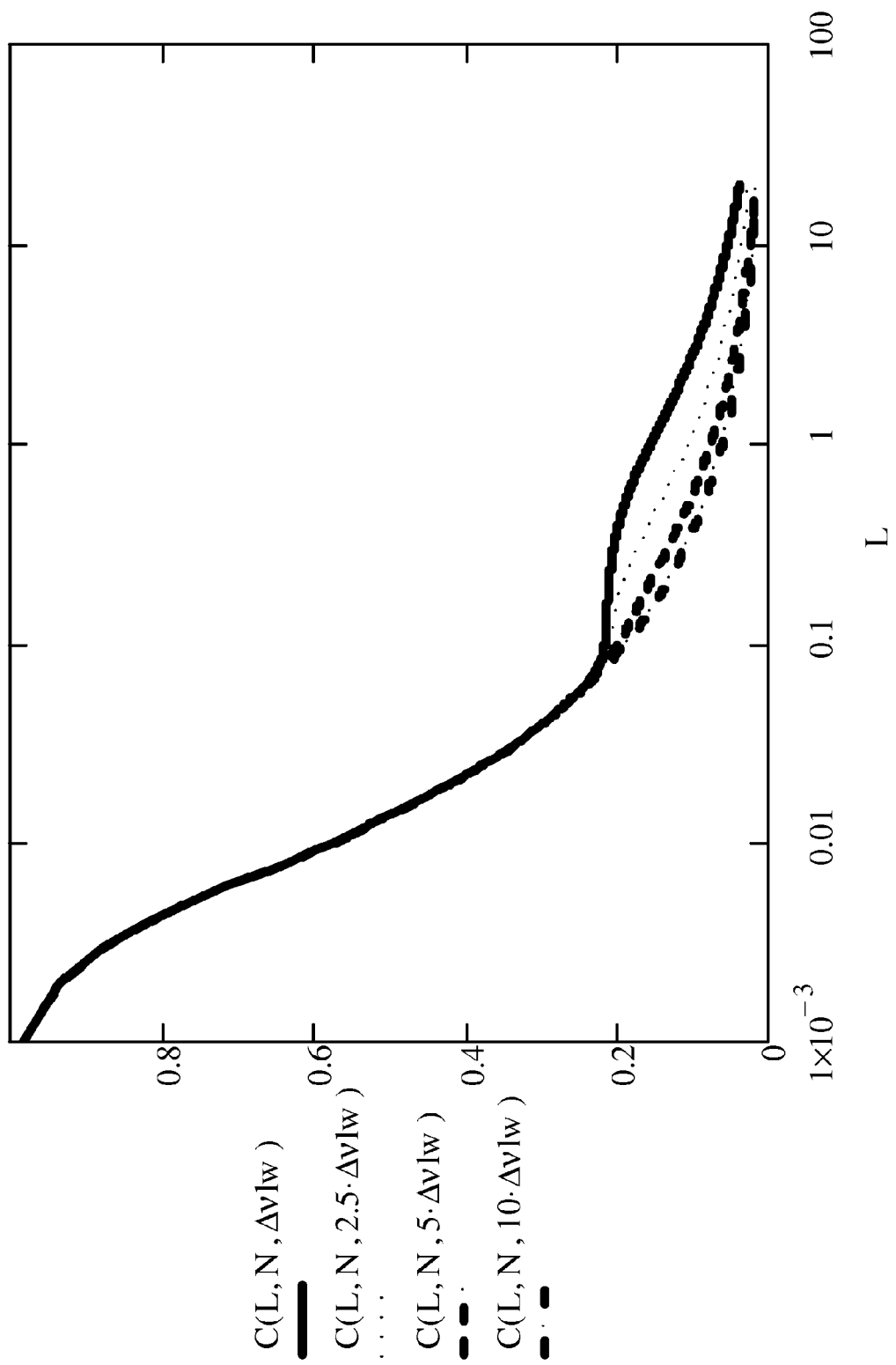
FIG. 5 is a graph showing objective speckle contrast versus fiber length as per an aspect of an embodiment of the present invention, assuming a light source spectrum having a Gaussian envelope function and multi-line substructure, and assuming various ratios of spectral line width to spectral line spacing.

FIG. 5 is a graph showing speckle contrast versus fiber length for $\Delta\lambda=0.01$ nm, $\Delta\lambda_s=0.2$ nm, $\Delta\lambda_e=2$ nm, and four different values of $\Delta\lambda$: 0.01 nm (solid), 0.025 nm (dotted), 0.05 nm (long dashes), and 0.1 nm (short dashes), assuming a center wavelength of 500 nm.

Figure 6:
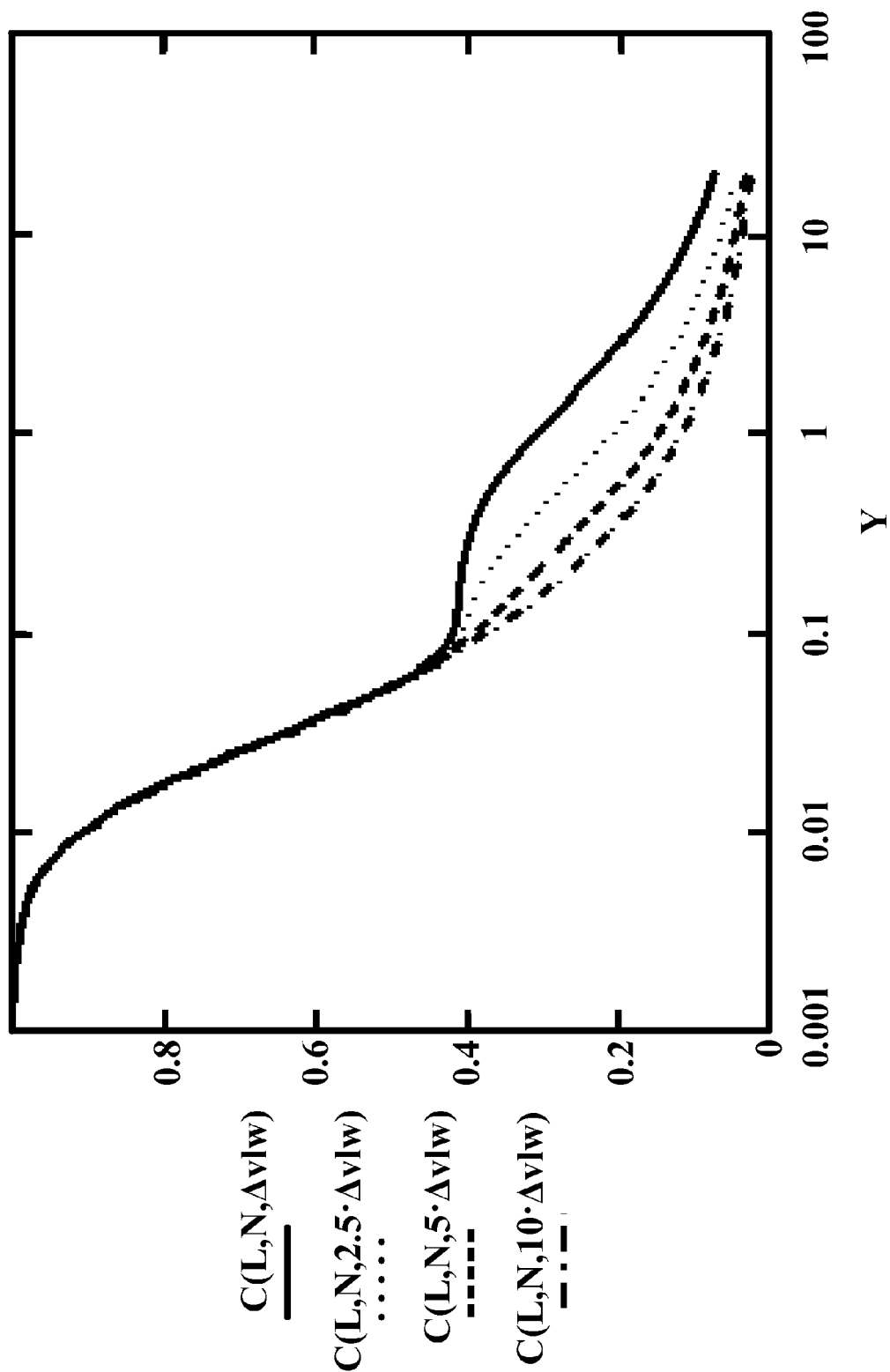
FIG. 6 is a graph similar to FIG. 5, except that the multiline spectrum has fewer total number of lines than the spectrum in FIG. 5.

FIG. 6 is similar to FIG. 5 except that $\Delta\lambda_e=0.5$ nm. As in FIG. 5, $\Delta\lambda=0.01$ nm (solid), 0.025 nm (dotted), 0.05 nm (long dashes), and 0.1 nm (short dashes). Equation 15 was used to generate the data for both figures. (Fiber NA is 0.22). FIG. 6 looks different because speckle contrast is higher in the plateau region, since fewer modes are involved. The plateau region is absent in both figures when the ratio $\Delta\lambda/\Delta\lambda_s$, is /0.25

Speckle Contrast in Projected Images

Having achieved a low objective speckle contrast value at the end of the fiber, the fiber end acts as a spatially and temporally incoherent (or partially coherent) illumination source for the projector. As a result of light propagating in the many different modes of the multimode fiber, with different time/phase delays corresponding to the various fiber modes, light emerging from the fiber behaves as if it had passed through a random phase-diffuser plate moving at very high speed—even though there is in fact no actual diffuser and nothing is moving physically in some of the various embodiments.

The projector may include a lens that produces (possibly magnified) images at the screen or image plane. Ignoring the wavelength diversity reduction factor ($R_\lambda$) for the moment, speckle contrast in the viewed image may be described as:

$$C = \sqrt{\frac{M+K-1}{MK}} \text{ (diffuser does not overfill projection lens)} \quad (21)$$

$$C = \sqrt{\frac{M+K+1}{MK}} \text{ (diffuser overfills projection lens)}$$

where M is the number of statistically independent intensity patterns being integrated over time as a result of the rapidly moving the diffuser plate (or equivalent thereof), and K is the number of projector lens resolution areas contained within one eye resolution area at the projection screen. This value for C corresponds to $1/R_\Omega$ in Eq. 2 and does not include any speckle reduction that might occur as a result of polarization or wavelength diversity.

The parameter M is more generally the number of "degrees of freedom" associated with temporally integrated speckle. In this case, M is the number of coherence times (associated with the light source spectrum) included within a time interval equal to the average time delay of light passing through the multimode fiber. Numerically, M may be equal to $(1/C_{end})^2$ where $C_{end}$ is the objective speckle contrast achieved at the end of the multimode fiber. For example, if $C_{end}=0.01$, then M=10,000.

The parameter K, which is the number of degrees of freedom associated with spatially integrated speckle, is essentially the number of projector lens resolution areas at the projection screen or image plane contained within one eye resolution area also measured at the projection screen or image plane. If distances from the screen to projector lens, and screen to eye pupil, are the same, then $K \approx (NA_{projector}/NA_{eye})^2$ where $NA_{projector}$ is the numerical aperture of the projector lens measured from the screen looking back at the projector lens, and $NA_{eye}$ is the numerical aperture of eye pupil measured from the screen.

M and K may be much greater than 1. The expected contrast in the viewed image due to illuminating with the multimode fiber, not considering system wavelength diversity or polarization diversity, may then given by:

$$C = \frac{1}{R_\Omega} * \sqrt{\frac{M+K}{MK}} \qquad (22)$$
$$= \sqrt{\frac{1}{M} + \frac{1}{K}}$$

for both cases of Eq. 21, but the K value used in Eq. 22 may be different according to whether the projector lens is overfilled or not. Expressions for K based on experimental eye measurement data may be:

$$K \approx (4.7 \times 10^{-7}) \frac{D^2 z_e^2}{\lambda^2 z_p^2} \text{ (projection lens overfilled)} \qquad (23)$$

$$K \approx (1.3 \times 10^{-6}) \frac{z_e^2}{b^2 m^2} \text{ (projection lens not overfilled)} \qquad (24)$$

In Eq. 23 for an overfilled projector lens, D is the diameter of the projection lens, $\lambda$ is the light wavelength, $z_e$ is screen-to-eye distance, and $z_p$ is the screen to projector lens distance. For a 100 mm diameter lens, equidistant pupil and lens, and 500 nm wavelength, $K \approx 18,800$, and $1/\sqrt{K}=1/137=0.007$. For a 60 mm diameter lens, $K \approx 6768$ and $1/\sqrt{K}=1/82=0.012$. These contrast values may be reduced by moving the eye farther from the screen than the projector, considering that K scales as $(z_e/z_p)^2$.

In Eq. 24 (projector lens not overfilled), b is the equivalent of the edge dimension of a square diffuser plate "phase cell" measured at the equivalent diffuser plate, and m is the magnification of the projection imaging system. However, in some of the various embodiments of the invention, b may be taken approximately as the width of a spatial coherence cell at the distal end of the multimode fiber. As a rough approximation, $b^2 \approx$ (core area)/(number of fiber modes propagating) $= \pi a^2/(4V^2/\pi^2) = \pi\lambda^2/(16 \text{ NA}^2)$, where $V=2\pi a \text{ NA}/\lambda$ may be used. Using a 0.22 NA fiber, then at 500 nm, $b^2$ may be approximately equal to $1 \times 10^{-12}$ m$^2$ and b may be about 1 μm. In Eq. 23, if $z_e=6$ m and m=300, then K may be $\approx 520$ in this case.

One may get higher K values by over-filling the projection lens, but with the possible tradeoff of somewhat lower projector efficiency and having to deal with diffraction effects. When under-filling the lens, even if K=500 ($1/\sqrt{K}=0.04$ to 0.05), one may still achieve 1% contrast in viewed images by ensuring that M>2000 (or so) and that $R_\lambda$ in Eq. 2 is greater than 5, for example.

Eq. 22 indicates that, even if objective speckle contrast at the end of the fiber is much less than 1% (M>>10,000), speckle contrast in the viewed image may be larger than 1% if K is too small. When illuminated with low-contrast light from the fiber, the projector lens aperture may literally restore partial spatial coherence over an area corresponding to the area of the lens's point spread function. This situation may cause residual speckle contrast to clamp at a minimum value of $1/\sqrt{K}$ as M increases. This may explain why speckle can sometimes be observed with broadband white-light sources.

The value for C given by Eq. 22 is the reciprocal of the $R_\Omega$ factor in Eq. 2. One may conclude that, in some instances of practical interest, it may be possible to achieve 1% speckle contrast in viewed images by achieving $R_\Omega > 100$. However, when $R_\Omega < 100$, one may still exploit wavelength diversity at the projection screen to achieve $R_\lambda$ such that $R_\lambda R_\Omega > 100$. In some embodiments, $R_\lambda$ can be made large enough that $R_\Omega$ values as low as 5 (or $1/R_\Omega$ as large as 0.20=20%) can be tolerated while still achieving 1% speckle contrast in viewed images.

Speckle Reduction Due to Wavelength Diversity

According to some of the various embodiments, a light source having a spectral bandwidth large enough to achieve objective speckle contrast in the range of <1% to 20% at the end of the multimode fiber may be useful. Since the projection screen or image plane may have surface roughness, this wavelength diversity may be exploited to further reduce speckle contrast in the viewed or recorded image.

Given an arbitrary light source spectrum, speckle contrast in the viewed image due only to wavelength (frequency) diversity may be given by:

$$C = \frac{1}{R_\lambda} \qquad (25)$$
$$= \left[ \int_{-\infty}^{\infty} K_G(\Delta v) \exp\left[ -\sigma_h^2 \left( \frac{2\pi \Delta v}{c} \right)^2 \right] d\Delta v \right]^{0.5}$$

where $K_G(\Delta v)$ is the autocorrelation function of the light source's normalized power density spectrum, and $\sigma_h$ is the standard deviation of the surface height fluctuations at the image plane=projection screen, and is assumed to obey circular Gaussian statistics. (This equation is analogous to Eq. 9). Normal-incidence and normal-observation angles, relative to screen normal, have been assumed. (An expanded version of Eq. 25, not included here, describes the effects of non-normal incidence and observation angles on $R_\lambda$). Eq. 25 also assumes that light is fully plane polarized before and after reflection from the screen; that is, it ignores any possible polarization diversity effects. This value for C is the reciprocal of $R_\lambda$ in Eq 2.

In other embodiments that may employ a transmissive screen, volume-scattering screen, or backlight panel, the value of $\sigma_h$ in Eq. 25 may be related to the statistical spread in distances that light experiences as it travels through the screen or panel and reaches the viewer's eye or other detector.

If the light source spectrum has a true Gaussian profile (no modulation or substructure) with 1/e full-width=$\delta v$, then Eq. 25 may become:

$$C = \left[ \sqrt{\frac{2}{\pi \delta v}} \int_{-\infty}^{\infty} \exp\left( -\frac{2\Delta v^2}{\delta v^2} \right) \exp\left( -\sigma_h^2 \left( \frac{2\pi \Delta v}{c} \right)^2 \right) d\Delta v \right]^{0.5} \qquad (26)$$

When integrated, Eq. 26 becomes (substituting $\delta\lambda=(\lambda^2/c)\delta v$):

$$C = \frac{1}{R_\lambda} \approx \left[ \left( 1 + 8\pi^2 \left( \frac{\delta\lambda}{\lambda} \right)^2 \left( \frac{\sigma_h}{\lambda} \right)^2 \right)^{-0.5} \right]^{0.5} \qquad (27)$$

In this case, the contrast reduction due to wavelength diversity at the projection screen may be determined by the ratio of $\sigma_h$ divided by coherence length of the illumination light, $\lambda^2/\Delta\lambda$. For example, if $\delta\lambda=10$ nm, $\lambda=500$ nm, and $\sigma_h=250$ µm, then $C\approx 0.15$ and $R_\lambda\approx 6.7$. Therefore, in this example, when used in combination with angle diversity, $R_\lambda R_\Omega$ products >100 might be achieved with $R_\Omega$ as low as 15, which corresponds to a projection lens diameter of about 45 mm. Since lens diameters of 60 to 100 mm may be typical of cinema-grade projectors, it should be possible with most laser light sources being considered here to achieve speckle contrast of 1% in viewed images.

When the light source spectrum has significant modulation or spectral substructure that makes it depart from a true Gaussian profile, then the integration indicated in Eq. 25 may be implemented numerically on a computer, for example. However, many of the light source spectra considered may be modeled as a multi-line spectrum having multiple Gaussian-profile lines or peaks, each having 1/e half-width=$\Delta\lambda$, center-to-center spacing=$\Delta\lambda_s$, and a Gaussian envelope function (with 1/e half-width=$\Delta\lambda_e$) with center wavelength $\lambda$. In this case, an analytical expression may be derived for speckle contrast due to wavelength diversity that is analogous to Eq. 15 by substituting $8\pi\Delta\lambda\sigma_h/\lambda^2$ for $2\pi c T g' \Delta\lambda/\lambda^2$ in Eq. 15:

$$C^2 = \left[1 + \frac{1}{2}\left(8\pi \frac{\Delta\lambda}{\lambda} \frac{\sigma_h}{\lambda}\right)^2\right]^{-1/2} \quad (28)$$

$$\frac{\sum_m \sum_n \exp\left(-\frac{(m^2+n^2)\Delta\lambda_s^2}{\Delta\lambda_e^2}\right)\exp\left\{-\left(\frac{(m-2)\Delta\lambda_s}{2^{1/2}\Delta\lambda}\right)^2\left\{1-\left[1+\frac{1}{2}\left(8\pi\frac{\Delta\lambda}{\lambda}\frac{\sigma_h}{\lambda}\right)^2\right]^{-1}\right\}\right\}}{\sum_m \sum_n \exp\left(-\frac{(m^2+n^2)\Delta\lambda_s^2}{\Delta\lambda_e^2}\right)}$$

It may be shown that this equation reduces to Eq. 27, with $\Delta\lambda$ replaced by $\Delta\lambda_e$, when $\sigma_h$ is adequately small, or when the spectrum is a Gaussian envelope with negligible substructure ($\Delta\lambda_s/\Delta\lambda_e \ll 1$ or $\Delta\lambda/\Delta\lambda_s \approx 1$). The value of C given by Eq. 28 is the same as $1/R_\lambda$, where $R_\lambda$ is the same factor as in Eq. 2.

Extended Mechanism Using a Plurality of Fibers in Each Color Channel

To achieve ≤1% contrast in viewed or recorded images, it may be necessary in some situations to include additional speckle reduction measures resulting in what we refer to as the "extended mechanism." Although more complicated, the extended scheme does not involve any moving components and preserves the basic intended aspects of our speckle-reduction mechanism.

Figure 10:
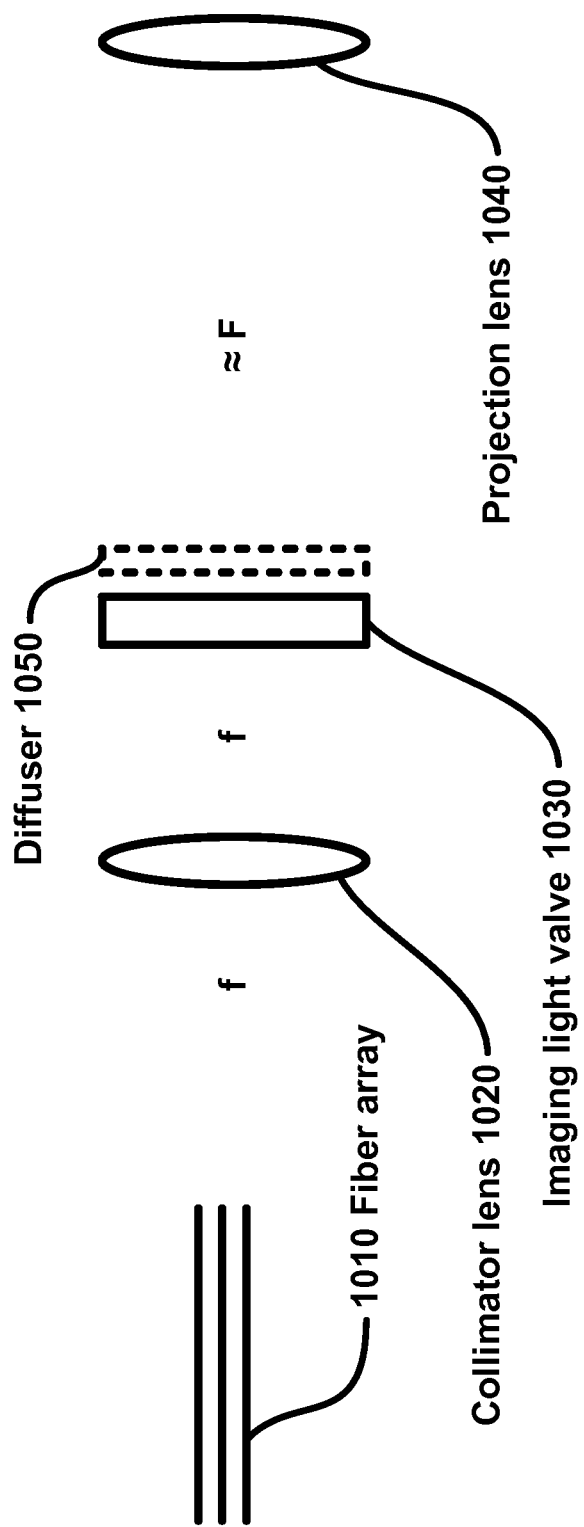
FIG. 10 is a block diagram showing an example layout of an extended system which uses a plurality of multimode optical fibers in each color channel, with the fibers having a predetermined spatial arrangement at their distal ends in order to achieve enhanced speckle contrast reduction as per an aspect of an embodiment of the present invention.

FIG. 10 shows the layout of the extended scheme system for one illumination channel of the display system, which is related to Kohler illumination as commonly used in optical microscopes. Several multimode fibers 1010, each of which may be coupled to a separate laser light source, may be configured into a 1D or 2D fiber array pattern at the distal ends of the fibers. The laser sources are incoherent relative to each other. Partially de-speckled light emerging from each of the multimode fibers may be up-collimated by the collimator lens 1020 to a diameter (say, 25 mm) that, after perhaps going through light-coupling optics such as a rod integrator or fly-eye lens array in some embodiments, fills the rectangular dimensions of the light-valve image-forming device 1030 (e.g., digital mirror device, liquid-crystal-on-silicon chip) being used in the projector. The distal/delivery ends of the fibers array 1010 may be positioned one focal length from the collimator lens 1020 having focal length, f. An optional fixed (not rotating or otherwise moving) diffuser plate 1050 may be placed a distance, f, on the other side of the collimator lens 1020. The light may then be used to illuminate the area of the projector's imaging device chip, and the image may be projected onto the screen using a projector lens 1040 with focal length, F, such that F>f. It is assumed that, to achieve large magnification of the projected image, the imaging device may be placed about one focal length F from the projection lens and that projector magnification at the screen is $m_{proj}$.

Speckle contrast is again given by Eq. 22, which we reproduce here:

$$C = \frac{1}{R_\Omega} \quad (22)$$

$$= \sqrt{\frac{M+K}{MK}}$$

$$= \sqrt{\frac{1}{M} + \frac{1}{K}}$$

As before, the parameter $M=1/C^2_{end}$ where $C^2_{end}$ is objective speckle contrast at the end of each multimode fiber in the array, and K is the number of projector lens resolution areas/elements at the projection screen contained within one eye resolution area or element. K is given by Eq. 23 or 24 depending on whether or not the projector lens is overfilled.

However, in the extended scheme of FIG. 10, speckle contrast in the viewed or recorded image, neglecting speckle reduction due to wavelength diversity, is given by:

$$C = \frac{1}{R_\Omega} = \frac{1}{N_{fiber}^{1/2}}\sqrt{C_{end}^2 + \frac{1}{K'}} \; ; \quad (31)$$

$$K' = K \cdot \left[\frac{NA_{collimator}}{NA_{projector}}\right]^2$$

where NAprojector is the numerical aperture (sin θ) of the projector lens pupil subtended at the diffuser plane, NAcollimator is numerical aperture of the collimator lens pupil subtended at the diffuser plane, and K' is related to K by the factor (NAcollimator/NAprojector)2, but only if NAcollimator is greater than or equal to NAprojector. Nfiber is the number of fibers in the fiber array.

Eq. 31 indicates that, when certain measures are taken to decorrelate the emissions from the multiple fibers (see below), speckle contrast in the viewed image may be reduced by as much as a factor of $1/\sqrt{N_{fiber}}$. Eq. 31 also anticipates that, in some cases, it may be possible to increase K to K' when $NA_{collimator}$ is greater than $NA_{projector}$. The extended mechanism may reduce the length of multimode fiber needed to achieve 1% contrast in the viewed image, and may reduce the projector lens diameter consistent with 1% contrast in viewed images.

To achieve the minimum speckle contrast value indicated in Eq. 31, the multiple fiber ends must be arranged to configure a "distal end bundle" such that there is a large enough transverse spacing (that is, spacing in a direction perpendicular to that of the optical axis) that the speckle patterns produced by each fiber are fully decorrelated at the projection screen or image plane via angle diversity. The required angular separation is that which shifts the speckle patterns from adjacent fibers by one eye resolution element at the screen. In a typical setup, as in FIG. 10, the minimum required spacing, $\Delta x$, is given by:

$$\Delta x = f \cdot m_{proj} \cdot \theta_{eye} \quad (32)$$

For example, if $\theta_{eye}=5\times10^{-4}$ radians, $m_{proj}=300$, and f=focal length of collimator lens=10 to 25 mm, then the required $\Delta x$ may be about 1.5 to 3.8 mm, which, considering the small fiber diameters that may be used (500 microns or less), could be implemented easily in practice.

However, it will be appreciated by someone of ordinary skill in the art that a useful amount of additional speckle contrast reduction may be achieved if the spatial separation between fibers is less than the transverse fiber spacing value that fully decorrelates the speckle patterns associated with the various multiple fibers.

Since a small-core-diameter multimode fiber diameter may be used, beam divergence after the collimator lens when using a single fiber may be low (e.g., 20 milliradians or less, assuming up-collimation to 10 mm diameter) even when using a fiber NA as high as 0.44. Therefore, most of the collimated light should reach and pass though the projector lens aperture. However, when using a multi-fiber array, beam divergence after the collimator lens may increase and may be determined by the lateral extent of the fiber array and the collimator focal length, f. Light collection by the projector lens might then be reduced as a result. The number of fibers in the array is limited practically by the spatial separation needed to decorrelate the speckle patterns and the tolerable reduction in projector throughput.

The enhanced value of K=K' may be regarded as a potential enhancement resulting from an increased number of lens resolution areas/elements being included within one eye resolution element at the screen. When $NA_{collimator}/NA_{projector}$, there may be as many as $(NA_{collimator}/NA_{projector})^2$ collimator lens resolution areas/elements, each of which contributes an independent speckle pattern at the screen, within each projector lens resolution element.

According to the above discussion, there is now an analytical framework for calculating expected objective speckle contrast at the end of the multimode fiber(s), and therefore M in Eq. 22, speckle contrast in the viewed or recorded image considering angle diversity and the number of decorrelated fibers used in each color channel ($R_\Omega$ of Eq. 31), and considering wavelength diversity ($R_\lambda$) at the projection screen or image plane. The additional speckle reduction effects of polarization diversity, if such should apply, may be included by application of Equation 2 with $R_\sigma=1, \sqrt{2}$, or 2, for example, depending on details of the polarization diversity situation.

In one preferred embodiment, a single multimode optical fiber delivers light for each color channel, the fiber length is less than 3 meters long, and objective speckle contrast at the end of the fiber is greater than 15% ($R_\Omega \leq \approx 6.7$). In this embodiment, spectral details of the color channel's light source (center wavelength, spectral profile, and emission bandwidth) and the effective screen roughness are chosen to achieve an $R_\lambda$ factor that is/14.9 if $R_\sigma$ due to polarization diversity is =1, an $R_\lambda$ factor that is/10.6 if $R_\sigma$ due to polarization diversity is =1.41, or an $R_\lambda$ factor that is/7.5 if $R_\sigma$ due to polarization diversity is =2. This embodiment results in a particularly compact and low-cost system when the employed light sources have an adequately large emission bandwidth.

In another preferred embodiment, a plurality of at least two multimode optical fibers delivers light in at least one color channel, and each multimode fiber may be coupled to a separate light source that is incoherent relative to other sources in the same color channel. The multimode fibers are transversely spaced at their distal ends so as to partially or fully decorrelate their speckle patterns in the viewed image. The fiber lengths are in the range of 0.1 to 30 meters, and objective speckle contrast at the end of the fibers is in the range of 5% to 20%. In this embodiment, the number of multimode fibers, the spectral details of the color channel's light sources (center wavelengths, spectral profiles, and emission bandwidths) and the effective screen roughness are chosen as per the above discussion to achieve the desired speckle contrast value in viewed or recorded images which may be 1% or less.

In another preferred embodiment, a plurality of at least two multimode optical fibers delivers light in at least one color channel, and each multimode fiber may be coupled to a separate light source that is incoherent relative to other sources in the same color channel. The multimode fibers may be transversely spaced at their distal ends so as to partially or fully decorrelate their speckle patterns in the viewed image. The fiber lengths are in the range of 0.1 to less than 3 meters, and objective speckle contrast at the end of the fibers is greater than 15%. In this embodiment, the number of multimode fibers, the spectral details of the color channel's light sources (center wavelengths, spectral profiles, and emission bandwidths) and the effective screen roughness are chosen as per the above discussion to achieve the desired speckle contrast value in viewed images which may be 1% or less. This embodiment may optimize system size, cost, and reliability when light sources have emission bandwidths in the 1 to 10 nm range.

In the paragraphs that follow, wavelength spectra that may be encountered when using specific laser-based light sources are described. In such cases, it is considered how the multimode fiber (or plurality of fibers) might be designed in order to achieve 1% speckle contrast in viewed or recorded images when using such light sources.

Speckle Reduction for Semiconductor Laser Diode Sources

Semiconductor laser diode (laser diode, LD) sources generate high power with adequate beam quality, may be relatively low-cost, and have overall emission bandwidths ranging from less than 1 nm to more than 10 nm. As such, laser diodes may be well-suited to making low-speckle light sources according to some of the various embodiments. This discussion primarily considers the use of broad-stripe, Fabry-Perot, edge-emitter laser diodes and arrays, but use of VCSELs and related surface-emitter laser diodes are also discussed.

Single-Emitter Fabry-Perot Laser Diodes

Fabry-Perot (FP) edge-emitter laser diodes include gain-guided and index-guided versions. High-power FP diode lasers tend to be gain-guided devices, but this discussion may apply to both types. Single-emitter FP laser diodes typically have multi-longitudinal-mode line spectra. Spacing between the longitudinal modes is $\lambda^2/2nL_{cav}$, where n is the refractive index of the semiconductor laser medium (roughly=3) and $L_{cav}$ is the length of the laser diode cavity (usually 300 to 500 microns for lower power devices, and 1 to 2 mm for high-power emitters). Accordingly, mode spacing values, $\Delta\lambda_s$, may be in the range of 0.02 nm to 0.2 nm at a 500 nm center wavelength. A high-power free-running FP laser with output power in the 0.1 to 1 W range (typical for visible-wavelength devices) might have a Gaussian envelope with 1/e half-width=1 nm and $\Delta\lambda_s=0.1$ nm, or about 25 longitudinal modes in the spectrum. Higher and lower numbers of modes may be possible; the actual number of modes lasing simultaneously and the width of the Gaussian envelope function depend on device design and operating conditions.

Linewidths of individual longitudinal modes in the spectrum may also depend on various design and operating factors, and may vary from <10 MHz to as much as 10 GHz. At 500 nm center wavelength, this range may correspond to $\Delta\lambda$ values of $10^{-5}$ nm to 0.01 nm. For linewidths at the low end of this range, the best one may hope to do is operate in Regime II of the multimode fiber (the plateau region).

When operating in the plateau region of the multimode fiber, simultaneous lasing on 25 equal-power modes may achieve speckle contrast at the end of the multimode fiber of about 0.20 (20%). For a Gaussian envelope function, the effective number of peaks, $N_{eff}$, used for calculating speckle contrast in the plateau region $(=1/\sqrt{N_{eff}})$ may be substantially less than the actual number of peaks lasing within the Gaussian envelope. Therefore, in this scenario, achieving 1% objective speckle contrast at the end of the fiber may be possible if operation in Regime III is possible (long enough fiber with adequately broad mode linewidths).

The width of the Gaussian envelope function, and therefore $N_{eff}$, may change as operating current is changed. The 1/e half-width of the envelope function often gets smaller as operating current is increased, thereby reducing $N_{eff}$. Mode-locking significantly increases the number of modes lasing simultaneously, compared to free-running operation of the same laser diode, and may reduce speckle contrast when operating in Regime II.

As suggested by FIG. 5, it may be possible to operate in Regime III and achieve speckle contrast of 1% if linewidths of the longitudinal modes are broad enough (0.01 nm or larger). Possible techniques for increasing mode linewidth include current modulation and inducing optical feedback into the diode laser so the longitudinal mode wavelengths "scan" erratically on a time scale much shorter than the integration time of the retina or other detector used in the imaging system.

Multiplexed Arrays of Fabry-Perot Laser Diodes

Until high-power, single-emitter LDs become available that provide 10 W at desired red, green, and blue wavelengths, it may be necessary or desirable to combine the emissions of multiple LD emitters for use in projection displays. A straightforward way to achieve high power and broad spectra may be to employ one of the various beam multiplexing techniques that have been developed to combine emissions from multiple incoherent emitters into a multimode fiber. Such mechanisms include fiber-array multiplexing (arrays of fibers mated to arrays of LD emitters, and then combining outputs of the multiple fibers into a multimode fiber), angle- or geometric multiplexing (using a macro-lens to focus multiple collimated LD beams into a multimode fiber), and wavelength beam combining (see below). In principle, the emissions of hundreds or thousands of incoherent emitters may be combined into a fiber with a core diameter in the 100- to 500-1 μm range and numerical aperture (NA) in the 0.1 to 0.4 range.

Multiplexed Arrays, Good Spectral Overlap

One may envision combining multiple laser diode emitters into the same fiber such that the combined spectrum has a quasi-continuous, quasi-Gaussian profile with 1/e half-width emission bandwidth in the range of 10 to 20 nm. For example, one might select devices having slightly different center wavelengths so the combined emission spans a 10 to 20 nm range. Alternatively, one may operate different devices at slightly different temperatures in order to stagger the spectra and span a wavelength range of several nanometers. Such spectra might be achieved using geometric/angle multiplexing or using fiber-array multiplexing mechanisms. Fiber-array mechanisms may particularly convenient for operating LDs at different temperatures as needed to shift wavelengths and tailor the combined spectrum.

If enough laser diode emitters are combined, and the center wavelengths of their spectra are staggered appropriately, the spectral substructure corresponding to multi-longitudinal mode operation may be effectively washed out so that Eq. 13 (or 16) may be applied. For example, if the combined laser spectrum is a reasonably good quasi-Gaussian profile with 1/e half-width=1 nm, then Eq. 13 may be used to estimate that a 60 meter, 0.22 NA fiber may achieve 1% objective contrast at the end of the fiber, as might a 15 meter, 0.44 NA fiber. If M=10,000 and K=6770 (Eq. 22 with a 60 mm diameter projection lens and 500 nm wavelength), then speckle contrast may be about 0.016. Using Eq. 28 to calculate $1/R_\lambda=0.25$ in this situation (assuming $\sigma_h=250$ μm), then $1/R_\lambda R_\Omega=0.016\times 0.25=0.004$. Speckle contrast well under 1% may then be achieved in the viewed image.

Multiplexed Arrays, Moderate Spectral Overlap

If the multi-line laser diode spectra may be combined in a quasi-random (not well-controlled) fashion, then one might achieve a combined spectrum such that the ratios, $\Delta\lambda/\Delta\lambda_s$, vary statistically over some range. As in the earlier discussion, if the smallest value of $\Delta\lambda/\Delta\lambda_s$, is in the range of 0.25, then the spectral substructure may be considered effectively washed out such that Eq. 13 may be applied. If the total number of combined longitudinal laser modes is high enough, and one is willing to use longer multimode fibers in the 50 to 100 meter range, then $\Delta\lambda/\Delta\lambda_s$ as small as 0.1 might enable objective speckle contrast of 1% at the end of the multimode fiber(s).

As a way to estimate speckle contrast in this case, it may be assumed, for example, that 10 diode emitters, each having 25 longitudinal modes spaced by $\Delta\lambda_s=0.1$ nm, may be combined into the fiber, and the spectra may be offset or "staggered" in wavelength by 0.01 nm. Therefore, the 250 modes may span a total range of 2.5 nm, which implies a Gaussian envelope function with 1/e half-width of 1 nm, as in the good-overlap case described above. It may also be assumed that the average spectral overlap ratio $\Delta\lambda/\Delta\lambda_s$, is equal to 0.1. Using Eq. 15, one calculates that a 60 meter, 0.44 NA fiber may achieve 1% objective speckle contrast at the end of the fiber and therefore 0.004 contrast in the viewed image, as before. If one were to use the same 60 meter, 0.22 NA fiber used earlier, then speckle contrast at the end of the fiber may be 0.022 and $1/R_\Omega$ may be 0.025. Since $1/R_\lambda=0.25$, according to Eq. 28, $1/R_\Omega R_\lambda$ may be 0.006 or still less than 1% in the viewed image.

Multiplexed Arrays, No Spectral Overlap

Another case that may apply to multiplexed laser diode emitters is that in which the individual multi-line spectra may not be overlapped well enough to adequately wash out spectral substructure. The combined spectrum consists of many distinct narrow longitudinal modes and, in general, the spacing between modes may not be well-controlled.

For the moment, consider the case where the multiple lines in the combined spectrum may be evenly spaced, but the individual linewidths may be a small fraction of the line spacing. Referring back to the previous example, if 250 modes may be spaced by 0.01 nm, but the individual line widths may be a very narrow 0.00001 nm, then Eq. 15 predicts objective speckle contrast at the end of fiber=0.07 for a 2 meter, 0.22 NA fiber. This is about equal to $1/\sqrt{250}$ as expected when operating in the plateau region. However, because the line widths may be so narrow, one remains in the plateau region (and speckle contrast at the end of the fiber remains=$1/\sqrt{250}$) for any practical fiber length longer than 2 meters or fiber NA higher than 0.22. Since $1/R_\lambda=0.25$ may still pertain here, speckle contrast in the projected image may be estimated at $0.25\times 0.07=0.018$. When operating in the plateau region, one way to reduce speckle contrast below this value is to increase the number of lines in the spectrum. If one maintains the same spacing as lines may be added, then speckle contrast in the projected image may be reduced not only as a result of a lower contrast at the end of the fiber, but also as a result of increased wavelength diversity at the projection screen. Even further reduction of speckle contrast may be achieved if the fiber can be made long enough (considering fiber NA) to get into Regime III, but doing so with a reasonable fiber length may require broadening the individual line widths.

When the lines in the combined spectrum are very narrow and randomly spaced, the (magnitude squared) fiber incoherent transfer function must, in principle, be narrower than the smallest center-to-center line spacing in the combined spectrum in order to achieve the Regime II speckle contrast value cited above, which assumed evenly-spaced modes. In practice, a somewhat shorter fiber may be tolerable depending on actual details of the combined spectrum. In a worst-case situation, if a very large number of longitudinal modes are randomly combined in the fiber, and the narrow lines are not overlapped, the fiber may have to be so long that the width of the fiber's incoherent transfer function approaches that of the individual mode line widths in order to achieve the Regime II speckle contrast value at the end of the fiber.

Wavelength-Beam-Combined FP Laser Diodes

Figure 7:
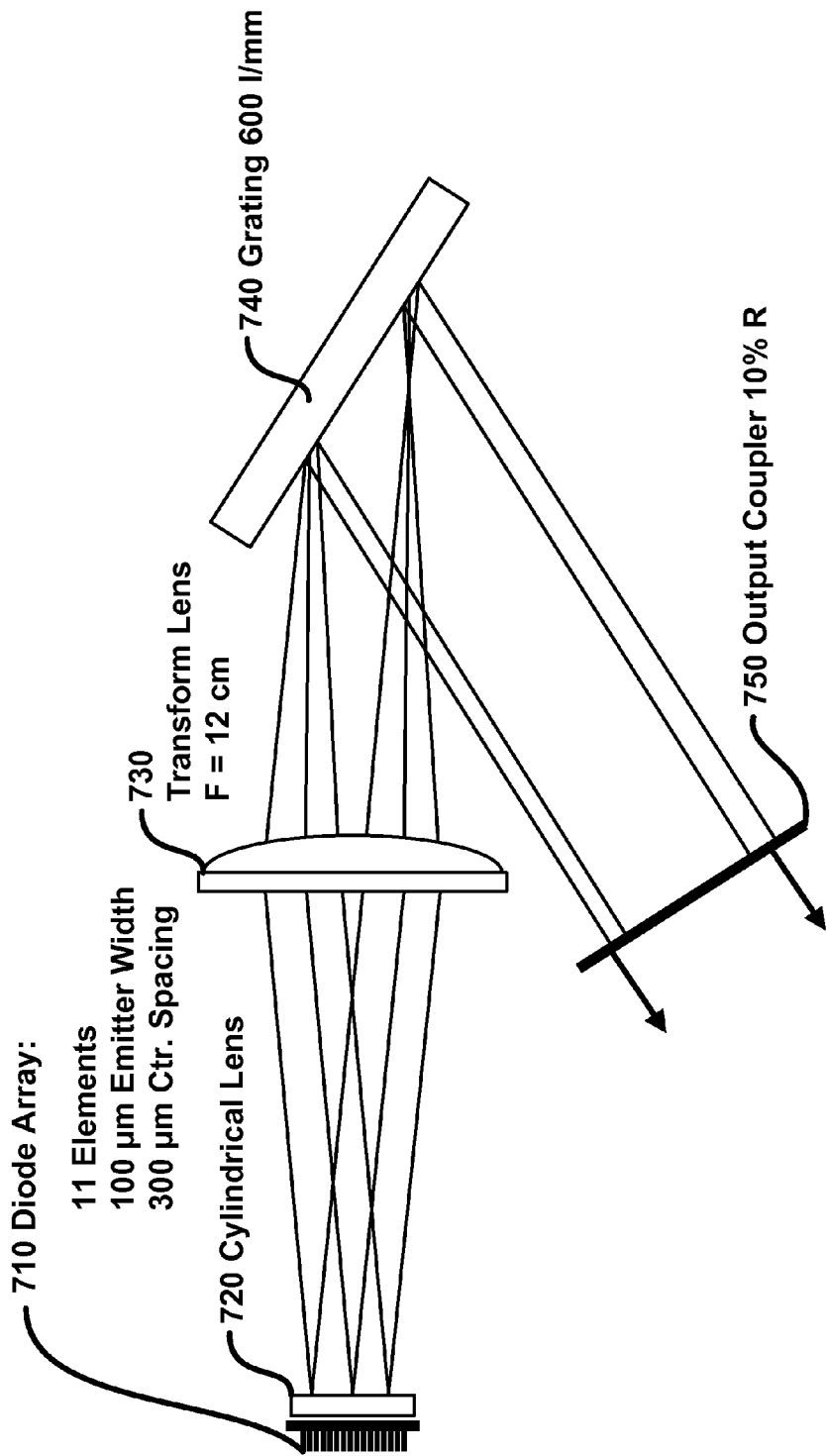
FIG. 7 is a diagram showing an example setup for wavelength beam combining of emitters in a diode array bar as might be used as a spectrally broadened light source per an aspect of an embodiment of the present invention.

Spectral beam combining (SBC) or wavelength beam combining (WBC) techniques may be used to couple emissions from multiple incoherent emitters, each having a slightly different wavelength, into a multimode optical fiber. Although other WBC configurations and techniques are possible, a common WBC setup, as illustrated in FIG. 7, includes a grating 740, a Fourier transform lens 730, an array of laser emitters 710 (in this case, a 1D diode array "bar") and an output coupler mirror 750. The Fourier transform lens 710, grating, and output coupler mirror may constitute an external cavity for emitters in the diode laser array, such that the external cavity forces each of the diode emitters to operate at a different wavelength as determined by grating dispersion and the Fourier transform lens acting together. (The diode bar and grating may be each located a distance f from the transform lens having focal length f).

In this case, emissions from the multiple LD emitters are forced by the external cavity to each have a different wavelength. The wavelengths may be separated by $\Delta\lambda_s$, which is determined by spatial separation of emitters in the focal plane of the Fourier transform lens, the focal length f, and grating dispersion, according to:

$$\Delta\lambda_s = \Delta x \left(\frac{d}{f}\right) \cos\theta \qquad (29)$$

where d is the grating groove spacing, θ is the angle of incidence on the grating, and $\Delta x$ is the spatial separation between emitters in the array. (First-order grating operation is assumed in this example).

Figure 8:
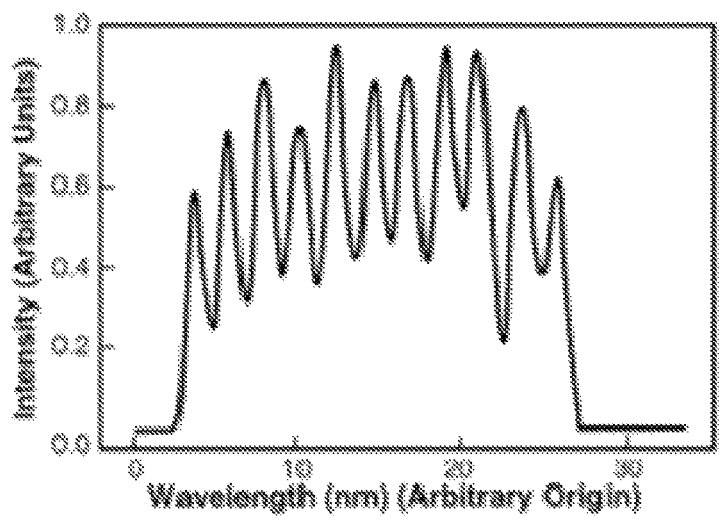
FIG. 8 is a graph showing a typical wavelength-beam-combined spectrum as might be employed per an aspect of an embodiment of the present invention.

A typical wavelength-beam-combined spectrum is shown in FIG. 8. When grating dispersion occurs along the array's slow-axis direction, the widths of the individual peaks, $\Delta\lambda$, may be determined by the "stripe widths" of the individual diode emitters which, in a typical 1D laser diode bar, may be identical. Therefore, the ratio of spectral peak width/spectral peak spacing may be determined by (but is not necessarily the same numerical value as) the ratio of diode emitter width/diode emitter spacing in the array. In other words, the ratio $\Delta\lambda/\Delta\lambda_s$ may be related to the fill-factor of the laser diode array in this WBC configuration. The WBC spectrum typically has an overall width of 10 to 20 nm, which may be large enough for effective speckle reduction by the mechanism of some embodiments, while, at the same time, being narrow enough to maintain a high degree of color saturation. The fill-factor of the bar may be made high enough that the ratio $\Delta\lambda/\Delta\lambda_s$ is in the 0.25 to 0.50 range, and one WBC scheme may achieve ratios as high as 0.8. As discussed earlier, a high fill-factor may facilitate speckle reduction by eliminating the plateau region of the multimode fiber.

When using wavelength beam combining mechanisms, the combined beams may be collinear and spatially overlapped (coaxial). This means that one may couple the beam into the multimode fiber such that all wavelengths may be coupled into all fiber modes. A mode scrambler may not be needed in such a situation.

For the above reasons, WBC laser diode arrays may be employed as spectrally broadened light sources according to some of the various embodiments of the invention. A single laser diode bar combined into a relatively short multimode fiber may provide enough power for large-venue display applications and achieve 1% speckle contrast. If more power is needed, multiple laser diode bars (2D array stacks) may be wavelength-beam-combined into the same multimode fiber, or, alternatively, fibers from several WBC bars (one fiber per WBC bar) may be bundled together as when using a plurality of fibers to achieve enhanced speckle reduction in each color channel using the extended method embodiments of the invention.

As an example, consider a WBC situation where $\Delta\lambda=0.25$ nm, $\Delta\lambda_s=1$ nm, $\Delta\lambda_e=10$ nm, and a total of 20 emitters may be combined. Eq. 15 predicts that speckle contrast=0.007 might be achieved at the end of a 25 meter/0.22 NA fiber, or a 6 meter/0.44 NA fiber. If a 100 mm diameter projection lens is used such that $1/\sqrt{K}=0.007$, then 1% speckle contrast may be achieved in the viewed image without relying at all on wavelength diversity at the projection screen ($R_\lambda=1$). Alternatively, if one exploits wavelength diversity at the screen ($R_\lambda=9.4$ by Eq. 28, $1/R_\lambda=0.11$), then one could achieve 8% objective contrast at the end of the fiber with a very short 20 cm/0.22 NA fiber and still achieve less than 1% speckle contrast in the viewed image.

The longitudinal modes of the external cavity are not shown in FIG. 8. If external cavity length is 50 cm, and wavelength is 500 nm, spacing between external-cavity longitudinal modes may be about 0.25 pm (0.00025 nm). This spacing is small enough that, in most cases of practical interest for using WBC light sources with some of the various embodiments, existence of the external-cavity substructure can be ignored.

Speckle Reduction for VCSEL and VECSEL Laser Diodes

Vertical cavity surface emitter lasers (VCSELs) offer many prospective advantages for use in some of the various embodiments. Emission bandwidths may be in the 0.1 to 1 nm range (and perhaps larger) and emission spectra have virtually no sub-structure. VCSEL emission wavelength may also be inherently more stable versus changes in operating temperature, compared to edge-emitter FP laser diodes, which may be important for maintaining color balance in laser projectors. VCSELs may be relatively low power lasers (100 mW), but, owing to their high beam quality, emissions from very many VCSELs may be multiplexed easily into a small-core, small-NA multimode fiber. High-power 2D arrays of VCSELs may be made and efficiently coupled into a multimode fiber. As an example, a 500 nm VCSEL array having a spectrum such that $\Delta\lambda=0.5$ nm may achieve 3% objective speckle contrast ($R_\Omega=33$) at the end of a 15 meter/0.22 NA fiber, and 1% speckle contrast in the viewed image by virtue of $R_\lambda=3$.

Vertical-external-cavity surface-emitter lasers (VECSELs) offer watt-level output power at visible wavelengths useful for projection displays. The external-cavity feature of such lasers allows a nonlinear optical crystal to be placed inside the laser resonator as needed to generate second harmonic light at red, green, and blue wavelengths. Such lasers are commercialized under the NECSEL™ brand name (NECSEL Intellectual Property, Inc.) and 1D arrays of NECSELs may produce multi-watt power levels at red, green, and blue wavelengths. However, these frequency-doubled VECSEL lasers have significantly different emission spectra, for our needs, than a VCSEL laser which directly produces visible light without nonlinear conversion. Frequency-doubled VECSEL spectra are usually multi-longitudinal-mode spectra having an envelope function only a few tenths of a nanometer wide, and very narrow longitudinal mode linewidths. As a result, frequency-doubled VECSELs are most likely to be used in Regime II (the plateau region), and many devices may need to be combined into the multimode fiber in order to achieve 1% objective speckle contrast at the end of the fiber. As an example, assume a frequency-doubled VECSEL array of 20 emitters such that each emitter has 12 longitudinal modes, and that modes may be spaced by 0.05 nm ($\Delta\lambda_e$=0.25 nm). If 100 such emitters (5 arrays, 1200 total modes) may be combined into the fiber with an average spacing between modes of 0.0005 nm ($\Delta\lambda_e$ still=0.25 nm), then speckle contrast=0.035 may be achieved at the end of a 30 meter/0.22 NA fiber, and speckle contrast in the viewed image may be about 2% (with $1/R_\lambda$=0.54). Lower contrast may be achieved, for example, by multiplexing more emitters into the fiber or by using a larger wavelength spacing to achieve a larger $R_\lambda$ factor.

Speckle Reduction for Femtosecond Lasers

Femtosecond lasers are usually mode-locked lasers having a multi-line spectrum and a nominally Gaussian envelope function. The individual longitudinal modes are locked in phase relative to each other, thereby resulting in ultrafast pulse emission, and spectral widths of the longitudinal modes are typically much narrower than the separation between modes. Although the laser modes may be locked in relative phase, the autocorrelation of the power density spectrum, $C_p(v)$, which enters into Eq. 9 includes no phase information. Therefore, $C_p(v)$ is identical to that of a non-mode-locked multi-longitudinal-mode laser except that the mode-locked spectrum typically has many more modes.

The spectral bandwidth of a transform-limited 100-fs (FWHM) mode-locked laser, operating at 500 nm center wavelength, is about 3.7 nm FWHM (for the Gaussian envelope). Cavity length for a typical mode-locked laser is in the 100 cm range, which implies a longitudinal mode spacing of $10^{-4}$ nm. Therefore, using Eq. 15, a fiber length of about 20 meters (fiber NA=0.22) might achieve objective speckle contrast of 1% operating in Regime I. Operation in Regime II, with a longer and/or higher-NA fiber, might also achieve 1% contrast considering that more than 10,000 modes may be lasing simultaneously. If pulse duration is shorter than 100 fs, then even shorter multimode fibers may achieve 1% contrast at the end of the fiber. Since the width of the envelope function is nanometers wide, a large $R_\lambda$ factor readily enables 1% speckle contrast in the viewed image.

The peak power of a femtosecond laser may be high enough to incur (usually unwanted) nonlinear effects in the multimode delivery fiber that may change the spectrum of light passing through it. Such nonlinear effects may be controlled by adjusting the core diameter of the multimode fiber. Cost, size, reliability, and ease-of-use are the main problems with today's high-power femtosecond lasers that might otherwise be suitable for large-venue display applications. The technology is advancing rapidly, so this situation could change.

Speckle Reduction for Picosecond Lasers

High-power red, green, and blue picosecond lasers have been developed for large-venue display applications. The spectral bandwidth of a transform-limited 1-picosecond (FWHM) laser operating at a 500 nm center wavelength is about 0.4 nm FWHM (1/e half-width approximately 0.5 nm for the Gaussian envelope). If cavity length is 1 meter and longitudinal mode spacing is $10^{-4}$ nm, then Eq. 15 predicts 0.012 objective speckle contrast at the end of a 100 meter/0.22 NA fiber, or a 25 meter/0.44 NA fiber. Since Eq. 28 predicts $1/R_\lambda$=0.33 for 250 μm screen roughness, speckle contrast in the viewed image could be well under 1%.

If the transform-limited pulse duration is 10 ps (0.04 nm FWHM bandwidth), then a 40 meter/0.44 NA fiber may achieve about 0.03 speckle contrast at the end of the fiber, which, since $1/R_\lambda$ is 0.87 in this case, may not be good enough to achieve 1% contrast in the viewed image.

A straightforward way to broaden the spectrum of a picosecond laser is to inject light into a small-core (e.g., <100 μm) optical fiber which broadens the spectrum via self phase modulation (SPM). SPM theory indicates that observed spectral broadening depends on laser intensity (W/cm²), pulse duration, and propagation distance in the fiber according to:

$$\Delta v = \frac{2 L n_2 I_o}{\lambda_o \tau} \tag{30}$$

or $$\Delta\lambda = \frac{\lambda_o}{nc} \frac{2 L n_2 I_o}{\tau}$$

where $\Delta\lambda$ is the spectral broadening at vacuum wavelength $\lambda_o$, L is the propagation distance (fiber length), $I_o$ is peak laser intensity in the fiber, $n_2$ is the fiber's nonlinear refractive index, n is the fiber's linear refractive index, c is the speed of light, and τ is laser pulse duration.

As an example of what's possible, the use of a 100-micron-core silica glass fiber has been reported to spectrally broaden 527 nm picosecond laser pulses. Input bandwidth was 1.5 nm at 527 nm and peak power density in the fiber was 3.2 GW/cm² (2 μJ pulse energy, 8 ps pulse duration).

Figure 9:
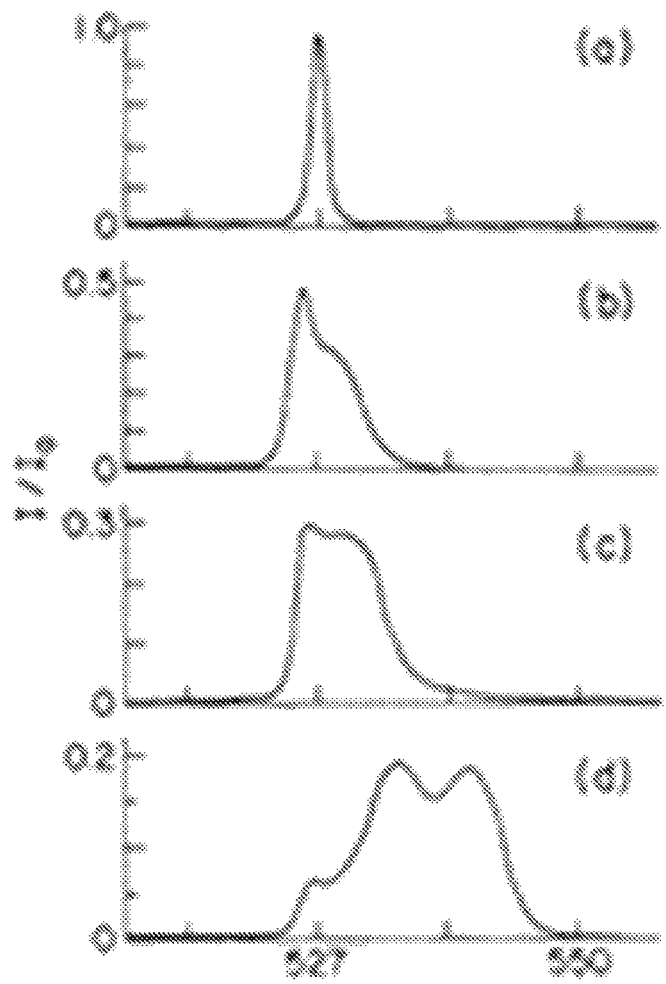
FIG. 9 is a series of plots showing the output spectra for picosecond laser pulses propagating through different lengths of 100-micron-core glass fiber, and spectrally broadened via self-phase modulation, as per an aspect of an embodiment of the present invention.

FIG. 9 shows output spectra for 8-psec pulses at 527 nm propagating through different lengths of 100-micron-core glass fiber: (a) No fiber (b) 22 cm (c) 42 cm and (d) 84 cm. The observed spectral bandwidths were: 5.8 nm FWHM for a 22 cm fiber length (factor of 3.9 increase), 7.7 nm for a 42 cm length (factor of 5.1 increase), and 13 nm for an 84 cm length (factor of 8.7 increase). The result for the 84 cm fiber includes some broadening due to stimulated Raman scattering.

Results were achieved using rather high pulse energy (2 μJ), but the fiber core size was also quite large (100 μm). It should be possible to achieve similar results using lower pulse energies in the 0.1 to 0.5 μJ range using somewhat smaller-core fibers. Since one only needs broadening into the 0.1 to 1 nm range in our speckle reduction scheme, use of SPM broadening with picosecond pulses is feasible.

Speckle Reduction for Fiber Lasers

High-power fiber lasers emitting at visible wavelengths have great potential for use with the proposed speckle reduction mechanism. Prospective devices include up-conversion fiber lasers pumped with infrared laser diodes, down-conversion fiber lasers pumped with blue laser diodes, and infrared fiber lasers converted to visible wavelengths using nonlinear conversion; e.g., frequency-doubled fiber lasers.

Fiber lasers have potentially wide emission bandwidths and long cavity lengths such that despeckling may be achieved using a multimode fiber operating in Regime I. For example, 500-femtosecond fiber-based lasers have been frequency-doubled to generate high average power at 522 nm with a 2 nm FWHM emission bandwidth, and having a longitudinal mode spacing of $10^{-4}$ nm. With such a laser, 1% speckle contrast may be achieved using a 60-meter, 0.22 NA fiber or a 15 meter, 0.44 NA fiber, for example.

A continuous-wave fiber laser pumped with blue (GaN) laser diodes has been reported that produced 600 mW of cw power at 522 nm with an emission bandwidth of 1.2 nm FWHM. Fiber laser cavity length was only 4 cm, which corresponds to a longitudinal mode spacing of about 0.002 nm. Eq. 15 predicts objective speckle contrast of 0.034 at the end of a 10 meter, 0.22 NA fiber operating in Regime II. The corresponding $R_\Omega$ value may be =30. Considering that $R_\lambda$=3.3 for such laser (assuming 250 μm screen roughness), speckle contrast of 1% should be achievable in the viewed image using a 60 mm diameter projection lens.

Speckle Reduction for Broadband OPO/OPA Sources

Optical parametric oscillators (OPOs) and amplifiers (OPAs) are nonlinear optical devices that may generate broadband visible light when optically pumped with a narrowband pump laser. Such devices may be continuously tunable in that they generate any wavelength of interest in the visible range, starting with a fixed-wavelength pump laser, simply by adjusting some operating parameter of the nonlinear crystal(s) being used. Continuous tunability renders OPO/OPA devices potentially attractive for 3D laser displays based on six- and other multi-wavelength schemes. Average power levels in the 10 W range may be achieved at red, green, and blue wavelengths. If the spectra are not deliberately narrowed, OPO and OPA emission spectra are usually at least several nanometers wide and may be tens of nanometers wide.

OPOs intended for projection displays typically employ a nanosecond-pulse laser to pump nonlinear crystals placed in an optical resonator. Historically, the nonlinear crystals have been operated in a high temperature oven (e.g., 150° C.), but recent advances in magnesium-oxide-doped nonlinear materials may allow reliable operation of nanosecond OPOs at or near room temperature. OPO cavity lengths may be in the 5 to 10 cm range. It should be straightforward to achieve 1% speckle contrast using such a source as described in the previous section for the visible fiber laser having a 4 cm cavity length.

OPAs pumped by ultrafast lasers (picosecond or femtosecond) may be attractive because the need to operate nonlinear crystals in a high-temperature oven is often eliminated. OPAs pumped by nanosecond lasers may also operate reliably near room temperature when magnesium-oxide-doped, periodically-poled nonlinear crystals may be used. An optical resonator is not required in an OPA device, which means that the associated spectra do not have longitudinal mode substructure. Speckle reduction to 1% may be possible using a multimode fiber operating in Regime I.

Speckle Reduction for Nanosecond Lasers

Nanosecond-pulse RGB lasers have been developed for projection displays that provide average power levels in the 5 to 10 W range at pulse rates of 25 kHz, and with pulse energies of a few hundred microjoules. Red, green, and blue wavelengths may be generated from a 1-μm-wavelength pump laser using nonlinear frequency conversion mechanisms. The green wavelength has a very narrow spectral bandwidth (<0.05 nm), but the red and blue emission spectra have bandwidths of a few nanometers since these wavelengths may be generated using a green-pumped optical parametric oscillator (OPO). The OPO's infrared "signal" and "idler" emission wavelengths may be frequency-doubled to produce relatively broadband red and blue emission.

Considering only the green (non-OPO) light in such systems, Eq. 30 indicates that it may be much more difficult to achieve spectral broadening due solely to self phase modulation (SPM) when using nanosecond-pulse lasers. With 200 μJ of pulse energy in a 10 ns pulse, Eq. 30 implies that, using the same 100-1 μm silica fiber as in FIG. 9, one may need a 10,000 times longer fiber (10 km) to achieve SPM-broadening, which is not practical.

On the other hand, not much spectral broadening may be needed employing several of the various embodiments of the invention. A spectral bandwidth of 0.1 nm might achieve 1% speckle contrast at the end of a 80 meter, 0.66 NA fiber if the spectrum has no substructure. Such fibers may not be commercially available today, but could be in the future. Note that, since $R_\lambda$ may be =1.16 (250 μm screen roughness), one would not get much help from wavelength diversity to reduce speckle contrast in the viewed image. If the spectrum can be broadened to 0.5 nm, without substructure, then a 36 meter, 0.44 NA fiber might achieve 1% speckle contrast at fiber's end, and $R_\lambda$ may be =2.1. Speckle contrast in the viewed image might then be less than 1%.

Various approaches may be considered for spectrally broadening nanosecond-pulse light into the 0.1 to 1 nm range. One might use a much smaller-core fiber, but coupling high-average power into a 10-micron-core fiber, for example, with high efficiency and good reliability may be problematic. One might use a highly nonlinear fiber (with increased $n_2$ in Eq. 30) to reduce the required length of broadening fiber or enable larger core sizes. However, the value of $n_2$ in Ge-doped silica fibers is typically no more than a factor of two or three higher than for pure silica fibers, and absorption losses increase as the Ge doping level is increased. Lead silicate glass and related specialty fibers have $n_2$ values about 10 times larger than that of pure silica, and bismuth oxide-based glasses have $n_2$ values more than 50 times that of pure silica, but these fibers absorb strongly at visible wavelengths.

Another option may be to use a hollow-core (e.g., photonic bandgap) fiber filled with a suitable nonlinear medium. Media that have been investigated in hollow-core fibers include ethanol, water, nitrobenzene or carbon disulfide, and noble gases such as xenon. A useful amount of spectral broadening may be achieved with a nanosecond-pulse laser when using SPM in a 30-cm-long carbon disulfide ($CS_2$) free-space cell (not a hollow fiber), and using a large beam diameter of 3 mm. Using Eq. 30 to extrapolate results, a $CS_2$-filled, 100-1 μm, hollow-core fiber only 1 meter long might achieve spectral broadening into the 0.1 to 1 nm range using 500 μJ, 10 ns (50 KW peak power) pulses. The potential problem with this approach may be that transmission through meter-long lengths of filled fiber tend to be low (e.g., 50%), but this could change as hollow-core fiber technology improves.

One might also use a free-space $CS_2$ cell to achieve spectral broadening. Eq. 30 suggests broadening to 0.1 nm could be achieved using 500 μJ pulses (at 500 nm wavelength) focused to a beam diameter of about 400 μm in a 30-cm-long $CS_2$ cell, if laser pulse duration is in the 4 to 5 ns range.

Spectral broadening due to stimulated Raman scattering (SRS) can be achieved readily with nanosecond pulses in silica glass fibers of reasonable core size and length. Some system developers have been able to exploit SRS to achieve very good speckle reduction in laser projection displays using a multimode delivery fiber. However, spectral broadening due to SRS might be considered hard-to-control and may not always be compatible with the color space scheme (color gamut) one is trying to achieve. Some system designers may prefer a spectral broadening mechanism that does not generate the multiple Stokes wavelengths typical of SRS spectra in optical fibers.

It may be possible to broaden nanosecond-pulse spectra by injecting light into a fiber having a zero-dispersion wavelength (ZDW) shorter than the input wavelength such that propagation occurs in the fiber's anomalous dispersion regime. One might then expect spectral broadening due to soliton fission and super-continuum generation. However, at present, obtaining fibers with zero-dispersion-wavelengths shorter than 670 nm may be difficult.

One way around this problem is to mix 1-micron-wavelength infrared light and its corresponding frequency-doubled green light in the same fiber, using a fiber with a zero-dispersion wavelength between the infrared and frequency-doubled wavelengths. Infrared light experiences anomalous dispersion as it propagates and may break up into ultrafast pulses as a result of soliton fission. The infrared soliton light spectrally may broaden the visible light co-propagating in the same fiber by the process of cross-phase modulation (XPM) and other nonlinear processes. Such broadening has been demonstrated, for example, by injecting 1064 nm and 532 nm emission from a nanosecond-pulse, frequency-doubled microchip laser into a fiber having a zero-dispersion wavelength slightly shorter than 1064 nm. In theory, one might limit spectral broadening to a nominal 10 nm bandwidth by properly controlling input peak-power density, core diameter, and/or fiber length. A challenge with this approach, is that ZDW-shifted fibers tend to be single-mode fibers that may not reliably handle high average power.

Speckle Reduction for Narrowband CW Lasers

Continuous-wave (cw) lasers are commercially available that provide more than 10 W at green wavelengths. These lasers might be well-suited for projection displays were it not for severe speckle contrast resulting from very narrow emission bandwidth. These lasers are typically single-frequency lasers having a spectrum that consists of a single longitudinal mode with a width on the order of 1 MHz ($<10^{-6}$ nm at 500 nm).

As was discussed for nanosecond lasers, the single-mode cw spectrum must be broadened to at least 0.1 nm to use our speckle reduction mechanism with any practical length of multimode fiber. One possible solution may be to mix the cw green light with cw 1064 nm light in a photonic crystal fiber having a zero-dispersion wavelength between 1064 nm and 532 nm, as described above for nanosecond-pulse lasers—but this may not work for cw lasers if emission bandwidth is too small. Reliable implementation of this technique at high average power, and with a single-mode fiber, may not be feasible even when using a cw laser.

Another option may be to modulate the single-frequency cw laser emission using a bulk external phase modulator, thereby adding sidebands to create a multi-line spectrum. (A bulk modulator may be needed to handle high average laser power). Commercially available resonant phase modulators achieve a modulation frequency as high as 10 GHz. If one can generate 50 sidebands with 10 GHz spacing, then the overall width of the spectrum may be 500 GHz or about 0.4 nm at 500 nm. In this case, Eq. 28 indicates $1/R_\lambda=0.52$ if screen roughness is 250 μm. One may then need a $1/R_\Omega$ factor of 0.02 or less to achieve 1% speckle contrast in the viewed image. However, in the present example, operating the multimode fiber in Regime II (plateau region) may achieve $1/R_\Omega=1/\sqrt{50}=0.14$, which may not be good enough.

A second phase modulator might be used in tandem with the 10 GHz modulator to enable operation in Regime III of the multimode fiber. For example, if the second phase modulator has a modulation frequency of 100 MHz, it may add multiple sidebands spaced by 100 MHz to each of the sidebands generated by the first modulator, thereby broadening each of the 10 GHz-spaced sidebands. If each of the 50 sidebands from the 10 GHz modulator may be broadened to 4 GHz (40 sidebands spaced by 100 MHz), then Eq. 15 indicates that speckle contrast of 0.013 might be achieved at the end of a 100 meter, 0.44 NA fiber. Assuming a 60 mm diameter projector lens, $1/R_\Omega$ may be about 0.018, and $1/R_\lambda R_\Omega$ may be less than 1% in the viewed image.

Although bulk phase modulators that achieve more than 50 sidebands have been reported, it's not clear that generation of this many sidebands can be achieved easily with commercially available and low-cost phase-modulator devices.

Phase-locked sideband generation is basically what happens when a laser is actively mode-locked (placing the modulator inside the laser resonator) except that many more modes or sidebands lase simultaneously in a mode-locked laser. As discussed earlier, mode-locking to generate picosecond or femtosecond pulses enables 1% speckle contrast to be achieved in straightforward fashion using some of the various embodiments of the invention. Accordingly, it may be preferable to mode-lock the laser rather than modulate it externally.

Speckle Reduction Using High-Brightness LEDs

Great progress has been made in recent years to increase output power and improve the beam quality of visible light-emitting diodes (LEDs). High-brightness LEDs may be available at red, green, and blue wavelengths such that multiple LED emitters may be multiplexed into a fiber-optic bundle, or liquid light guide, to make high-power light sources potentially suitable for large-venue displays.

Liquid light guides may be attractive for delivery of LED light in that they may be readily available with "core" diameters as large as 10 mm, and in lengths of 1 to 2 meters and longer. They may be also relatively inexpensive. Transmission efficiency at visible wavelengths is in the 70% to 90% range for a nominal 1-meter-long guide.

Numerical apertures of liquid light guides may be in the 0.5 to 0.7 range. Since LED emission bandwidths may be several tens of nanometers wide, and LED spectra have virtually no substructure, such high NAs may be well-suited for application of our speckle reduction mechanism with relatively short light-guide lengths.

As an example, if LED bandwidth is 30 nm, Eq. 28 indicates $R_\lambda \approx 23$ for screen roughness of 250 μm, or $R_\lambda \approx 15$ for 100 μm roughness. If light-guide NA is 0.5 to 0.7, then any length longer than about 30 cm will result in a situation where M in Eq. 22 is greater than 10,000 so that $R_\Omega$ is dominated by the applicable K value. Even for projector lens diameters as small as 25 to 60 mm ($1/R_\Omega \approx 1/\sqrt{K} \approx 0.01$ to 0.03), speckle contrast in the viewed image could be much less than 1% due to the large $R_\lambda$ factors that may apply.

A potential issue is that, because the light-guide core diameter is already quite large (3 to 10 mm), as needed to efficiently couple LED emission into the guide, one may not rely as much on up-collimation (as when using small-core fibers) to reduce beam divergence so that projector efficiency does not suffer. There is probably a tradeoff to be made regarding power delivered through the light guide versus projector throughput. This issue may be especially important considering the trend toward higher F# (lower etendue) as a way to improve projector contrast ratio and efficiency. This situation may change as further improvements are made in LED power and beam quality.

Various embodiments provide a practical and versatile mechanism for achieving 1% speckle contrast and less in viewed or recorded images. The mechanism exploits intermodal dispersion in one or more multimode fibers (in each color channel) to create a low-speckle light source that may be used to illuminate the imaging light valve in a projector. No moving diffusers or other moving components may be needed. The mechanism may be used with many types of visible laser sources. Embodiments may be compatible with existing cinema-style projectors and potentially enable low-speckle laser sources to replace arc lamps with only minor projector modifications. When used with visible laser diodes, the speckle reduction characteristic of embodiments could be robust, compact, and low-cost enough for use in laser-based television. The mechanism may also be useful in other applications that require low-speckle UV, visible, or infrared illumination, and that can tolerate delivery through a multimode optical fiber.

Figure 11:
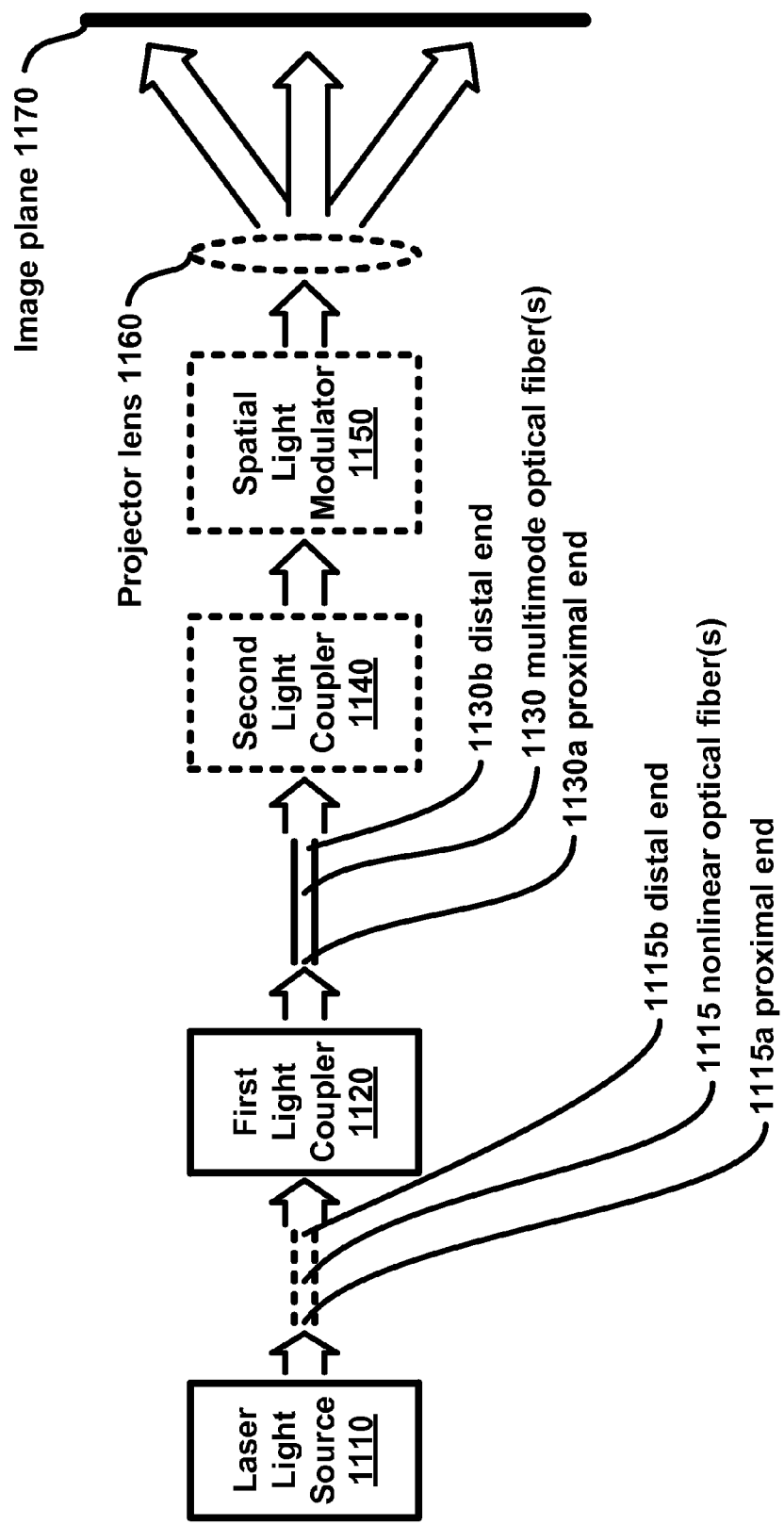
FIG. 11 is a block diagram of an embodiment that comprises a light source, multimode optical fiber(s), a first light coupler, a spatial light modulator, and a projection lens as per an aspect of an embodiment of the present invention.

FIG. 11 is a block diagram of an embodiment of the present invention that comprises at least a light source 1110, multimode optical fiber(s) 1130, a first light coupler 1140, an optional spatial light modulator 1150, and an optional projection lens 1160.

According to aspects of several of the embodiments, the light source 1110 may have a 1/e half-width emission bandwidth in the range of 0.05 nm to 20 nm. Alternative embodiments may have 1/e half-width emission bandwidths in other ranges, for example, the range of 2 to 15 nm, or in the range of 3 to 10 nm. The light source 1110 may be a laser light source, an LED light source, and/or the like. The light source 1110 may be at least one of the following: a red light source, a green light source, a blue light source, a cyan light source, a yellow light source, a magenta light source, a combination thereof, and/or the like.

According to some of the various embodiments, the light source 1110 in each channel may include at least two mutually incoherent light sources. Each of the light sources may illuminate a channel. Each of the light sources may have a wavelength spectrum of 1/e half-width emission bandwidth in a range, for example, of 0.05 to 20 nm, 2 to 15 nm, 3 to 10 nm, and/or the like. As mentioned earlier, the wavelength range may vary depending upon specific components and configurations of the apparatus. The at least two mutually incoherent light sources 1110 may include, for example, at least two to nineteen mutually incoherent light sources.

Channel(s) may be color channel(s) that transport light for a particular spectrum of light, such as for example, red light, blue light, green light, a combination thereof, and/or the like.

According to aspects of several of the embodiments, the multimode optical fiber(s) 1130 may be less than 3 meters in length and have a have a proximal end 1130a and a distal end 1130b. The multimode optical fiber(s) 1130 may be configured to substantially emit at the distal end 1130b only the spectrum of light that enters the proximal end 1130a. The multimode optical fiber(s) 1130 may include step index multimode optical fiber(s). In an alternative embodiment, the multimode optical fiber(s) 1130 may include gradient index multimode optical fiber(s) (GRIN). In yet other embodiments, the multimode optical fiber(s) 1130 may include liquid light guide(s).

According to aspects of several of the embodiments, the first light coupler 1120 may be configured to couple the proximal end 1130a to the light source 1110 such that objective speckle contrast at the distal end 1130b is larger than 15 percent.

According to some of the various embodiments, the multimode optical fiber(s) 1130 may include at least two multimode optical fibers, each of which is coupled to at least two separate light sources such that the at least two separate light are mutually incoherent. In these types of embodiments, the first light coupler 1120 may be configured to couple the proximal end 1130a of the at least two multimode optical fiber(s) 1130 in the channel to the at least two mutually incoherent light sources 1110 in the channel. The at least two multimode optical fiber(s) 1130 may include, for example, two to nineteen multimode optical fiber(s).

According to some of the various embodiments, the distal end 1130b of multimode optical fiber(s) 1130a may be bundled into a distal end bundle. The distal end bundle may be configured to hold a collection of the distal end 1130b of each of the at least two multimode optical fiber(s) 1130 according to a spatial pattern configured to reduce speckle contrast.

According to aspects of several of the embodiments, the spatial light modulator 1150 may be configured to receive light that emerges from the distal end 1130b, and modulate the received light to form an image. The spatial light modulator 1150 may include at least one of the following: a digital light processing (DLP) chip, a liquid crystal on silicon (LCoS) chip, a grading light valve (GLV), and/or the like. In embodiments with a distal end bundle, the spatial light modulator 1150 may be configured to receive light that emerges from the distal end bundle and modulate the received light to form an image.

According to aspects of several of the embodiments, the projection lens or lens combination 1160 may transfer the image onto an image plane 1170. The projection lens or lens combination 1160 may have an effective diameter configured to minimize or reduce speckle contrast at the image plane 1170.

According to aspects of several of the embodiments, a second light coupler 1140 may be disposed between the distal end 1130b and the spatial light modulator 1150. The second light coupler may be a fly-eye lens array, a rod integrator, and/or the like. In embodiments with a distal end bundle, an optional second light coupler 1140 may be disposed between the distal end bundle and the spatial light modulator 1150. In yet other embodiments where there is not a spatial light modulator 1150, the optional second light coupler 1140 may be disposed between the distal end bundle and the optional projector lens 1160. In yet other embodiments where there is not a spatial light modulator 1150 or projector lens 1160, the optional second light coupler 1140 may be disposed between the distal end bundle and an object to be illuminated, such as, but not limited to, a back light unit for a liquid crystal display. In yet other embodiments where there is not a spatial light modulator 1150, a projector lens 1160, or a second light coupler 1140, the distal end bundle may be positioned to illuminate an object or scene.

According to aspects of several of the embodiments, a mode scrambler may be disposed near the proximal end 1130a and configured to excite modes of the multimode optical fiber(s) 1130.

According to aspects of several of the embodiments, a multimode optical fiber vibrator (device that physically moves the fiber or fibers) may be employed to create time-varying speckle patterns such that speckle contrast may be reduced by temporal integration performed by the viewer's eye or other detector. Similarly, some of the various embodiments of the present invention may employ an image plane or projection screen vibrator device that physically moves the screen or image plane.

FIG. 11 is a block diagram of an embodiment that comprises a light source 1110, an optional nonlinear optical fiber(s) 1115, a first light coupler 1120, multimode optical fiber(s) 1130, a second light coupler 1140, an optional spatial light modulator 1150, and an optional projection lens 160 as per an aspect of an embodiment of the present invention. According to aspects of several of the embodiments, nonlinear optical fiber(s) 1115 may be disposed between the light source(s) 1110 and the first light coupler optics 1120 that couple light into the multimode optical fiber(s) 1130. Each of the nonlinear optical fiber(s) 1115 may be configured to increase the bandwidth of the wavelength spectrum of light that enters the proximal end of the nonlinear fiber(s) 1115$a$ so that light which exits the distal end of the nonlinear fiber(s) 1115$b$ is in the range of 0.05 to 20 nm in a given illumination channel of the display system. According to some of the various embodiments, at least one of the nonlinear optical fiber(s) 1115 and one of the multimode optical fiber(s) 1130 may be the same optical fiber(s). Second light coupler 1140 transfers light from the distal end 1130$b$ to spatial light modulator 1150 which creates an image that may be transferred to image plane 1170 via projector lens 1160.

Figure 12:
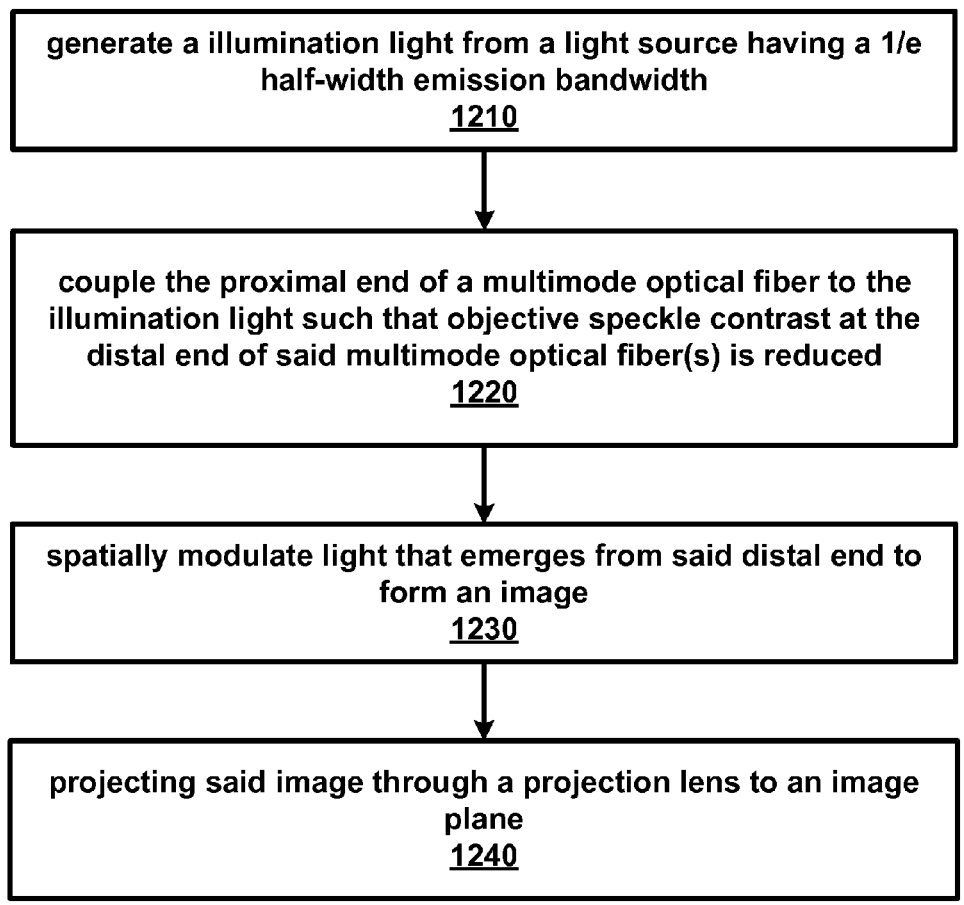
FIG. 12 is a flow diagram describing a speckle reduction process according to some of the various embodiments of the present invention.

FIG. 12 is a flow diagram describing a process according to some of the various embodiments of the present invention. At block 1210, an illumination light may be generated by a light source having a 1/e half-width emission bandwidth. The light source may be similar or the same as the light source 1110 described above.

At block 1220, the proximal end of multimode optical fiber(s) may be coupled to the illumination light such that objective speckle contrast at the distal end of the multimode optical fiber(s) is reduced. The multimode optical fiber(s) may be similar or the same as multimode optical fiber(s) 1130 described above.

At block 1230, light emerge from the distal end may be spatially modulated to form an image. The light may be spatially modulated employing a spatial light modulator 1150 as described above.

At block 1240, the image may be projected through a projection lens or lens combination to an image plane or projection screen. The image may be magnified by the projection lens. The projection lens or lens combination may have an effective diameter configured to minimize or reduce speckle contrast at the image plane. The projection lens may be similar or the same as projection lens 1160 described above.

Figure 13:
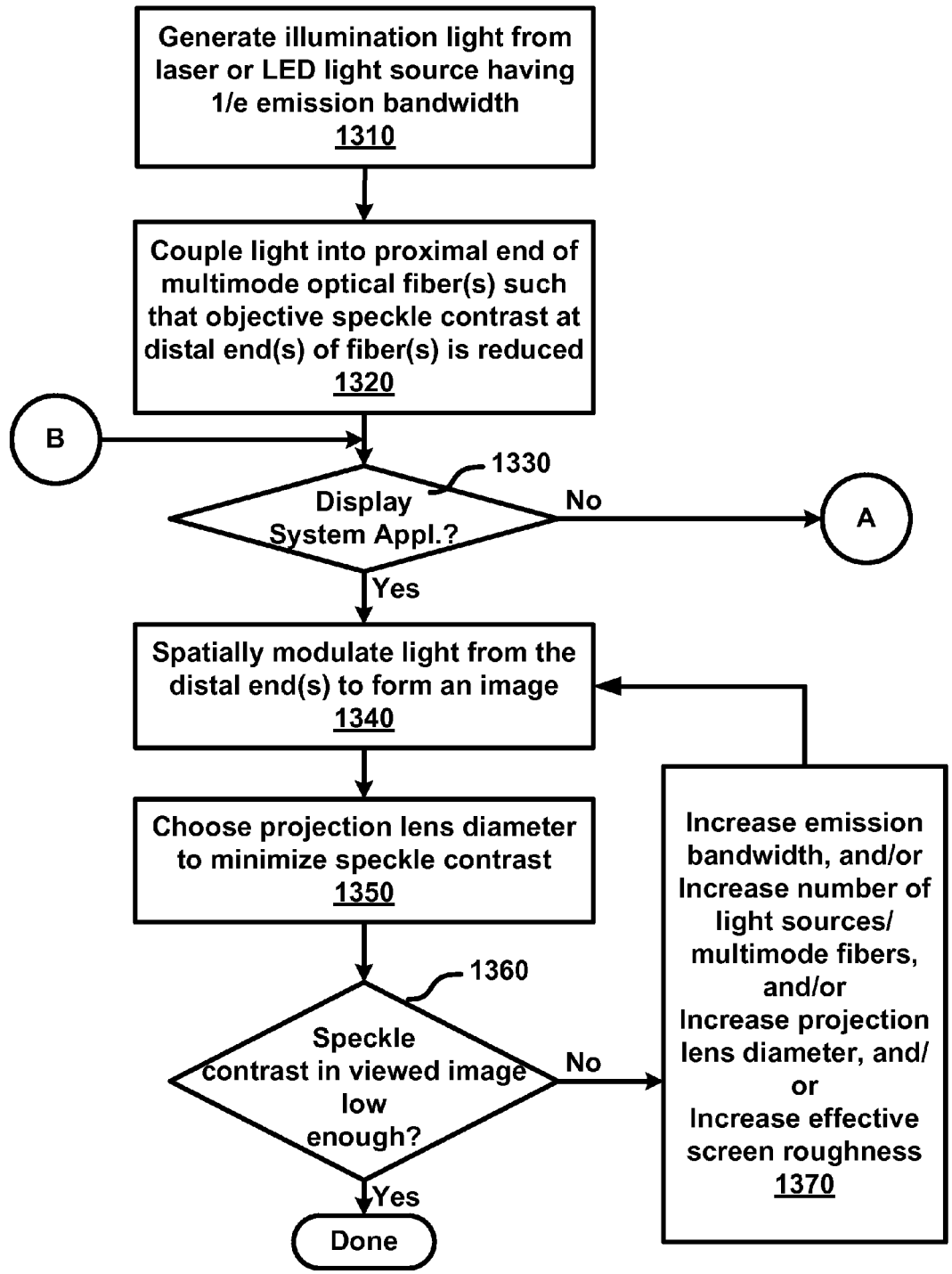
FIG. 13 is a flow diagram describing a speckle reduction process for achieving low speckle contrast in the various embodiments.

FIG. 13 is a logic flow diagram describing the process for achieving low speckle contrast in some of the various embodiments. At block 1310, an illumination light may be generated by a light source having a 1/e half-width emission bandwidth. The light source may be similar or the same as the light source 1110 described above.

At block 1320, the proximal end of multimode optical fiber(s) may be coupled to the illumination light such that objective speckle contrast at the distal end of the multimode optical fiber(s) is reduced. The multimode optical fiber(s) may be similar or the same as multimode optical fiber(s) 1130 described above.

If the light source is not part of a display system (block 1330), then light emerging from the distal fiber end(s) may be used to illuminate an object or scene to be imaged, as described below in FIG. 14 without using a spatial light modulator to create an image. Otherwise, at block 1340, light emerging from the distal end(s) may be spatially modulated to create an image employing a spatial light modulator 1150 as described above.

At block 1350, the image may be projected through a projection lens or lens combination to an image plane. The image may be magnified by the projection lens or lens combination. The projection lens may have an effective diameter configured to minimize or reduce speckle contrast in the viewed or recorded image. The projection lens may be similar or the same as projection lens 1160 described above.

At block 1360, a determination is made as to whether speckle contrast in the viewed or recorded image is low enough. If it is low enough, then the process is complete. If speckle contrast is not low enough, then one may take measures such as adjusting system parameters to further reduce speckle contrast in viewed or recorded images at block 1370. The measures that may be implemented to further reduce speckle contrast in viewed or recorded images include increasing the emission bandwidth of the light sources being employed, increasing the number of incoherent light sources and multimode fibers employed in each channel, increasing the projection lens diameter, and/or increasing effective roughness of the screen or image plane. Other measures may also be implemented to further reduce speckle contrast as described earlier in the specification.

Figure 14:
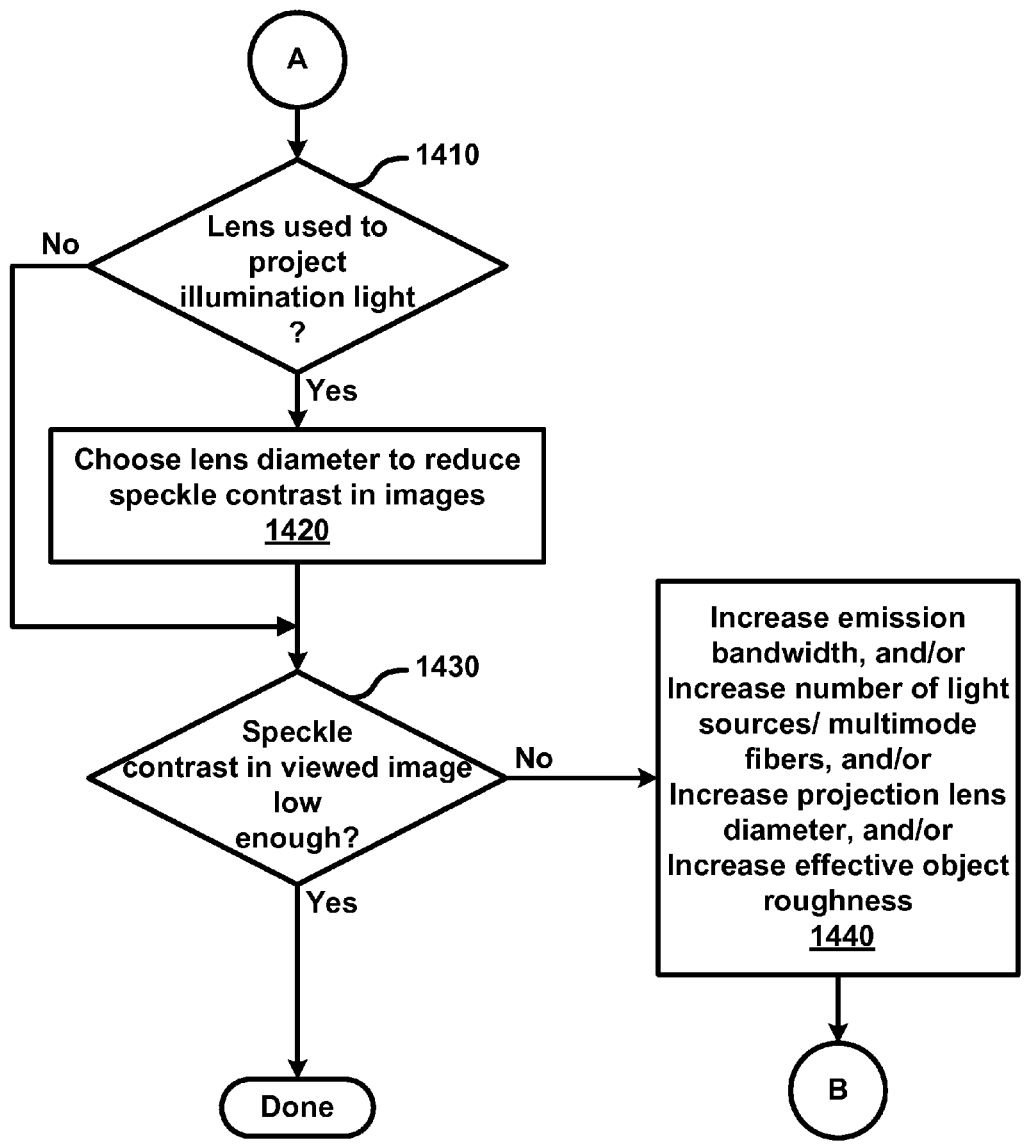
FIG. 14 is a flow diagram describing a speckle reduction process for achieving low speckle contrast in various embodiments that do not involve an explicit spatial light modulator device to create images.

FIG. 14 is a logic flow diagram describing a process for achieving low speckle contrast in the various embodiments which do not involve an explicit spatial light modulator device to create images.

An illumination light may be generated by a light source having a 1/e half-width emission bandwidth. The light source may be similar or the same as the light source 1110 described above. At 1410, a determination may be made as to whether or not a projection lens or lens combination is to be used to transfer light onto the object or scene being illuminated by the light source.

At block 1420, when a lens or lens combination is employed to transfer light onto the illuminated object or scene, the effective lens diameter may be chosen to reduce speckle contrast in viewed or recorded images.

At block 1430, a determination may be made as to whether speckle contrast in the viewed or recorded image is low enough. If it is low enough, then the process is complete. If speckle contrast is not low enough, then one may take measures such as adjusting system parameters to further reduce speckle contrast in viewed or recorded images. Measures that may be implemented to further reduce speckle contrast in viewed or recorded images include increasing the emission bandwidth of the light sources being employed, increasing the number of incoherent light sources and multimode fibers employed in each channel, increasing the projection lens diameter, and/or increasing effective roughness of the screen or image plane. Other measures may also be implemented to further reduce contrast as described earlier in the specification.

Many of the elements described in the disclosed embodiments may be implemented as modules. A module is defined here as an isolatable element that performs a defined function and has a defined interface to other elements. The modules described in this disclosure may be implemented in hardware, a combination of hardware be and software, firmware, wetware (i.e hardware with a biological element) or a combination thereof, all of which may be behaviorally equivalent. For example, modules may be implemented using computer hardware in combination with software routine(s) written in a computer language (such as C, C++, Fortran, Java, Basic, Matlab or the like) or a modeling/simulation program such as Simulink, Stateflow, GNU Octave, or LabVIEW MathScript. Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs); field programmable gate arrays (FPGAs); and complex programmable logic devices (CPLDs). Computers, microcontrollers and microprocessors may be programmed using languages such as assembly, C, C++ or the like. FPGAs, ASICs and CPLDs may be often programmed using hardware description languages (HDL) such as VHSIC hardware description language (VHDL) or Verilog that configure connections between internal hardware modules with lesser functionality on a programmable device. Finally, it needs to be emphasized that the above mentioned technologies may be used in combination to achieve the result of a functional module.

Some embodiments may employ processing hardware. Processing hardware may include one or more processors, computer equipment, embedded system, machines and/or the like. The processing hardware may be configured to execute instructions. The instructions may be stored on a machine-readable medium. According to some embodiments, the machine-readable medium (e.g. automated data medium) may be a medium configured to store data in a machine-readable format that may be accessed by an automated sensing device. Examples of machine-readable media include: magnetic disks, cards, tapes, and drums, punched cards and paper tapes, optical disks, barcodes, magnetic ink characters and/or the like.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) laser projection systems. However, one skilled in the art will recognize that embodiments of the invention could be used in other applications such as laser based television systems or other diverse displays, an in general illumination applications that require low speckle contrast when using visible, ultraviolet, and/or infrared light.

In addition, it should be understood that any figures that highlight any functionality and/or advantages, may be presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who may not be familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" may not be to be interpreted under 35 U.S.C. 112, paragraph 6.

What is claimed is:

1. An apparatus comprising:
    a) a visible light source having a wavelength spectrum of 1/e half-width emission bandwidth in the range of 1 to 20 nm;
    b) a multimode optical fiber:
        i) less than 3 meters in length,
        ii) having a proximal end;
        iii) having a distal end; and
        iv) configured to substantially emit at the distal end only the spectrum of light that enters the proximal end;
    c) a first light coupler configured to couple the proximal end to the light source such that objective speckle contrast at the distal end is larger than 15 percent;
    d) a spatial light modulator configured to:
        i) receive light that emerges from the distal end; and
        ii) modulate the received light to form an image; and
    e) a projection lens to transfer the image onto an image plane.

2. The apparatus according to claim 1, wherein the 1/e half-width emission bandwidth is in the range of 2 nm to 15 nm.

3. The apparatus according to claim 1, wherein the 1/e half-width emission bandwidth is in the range of 3 to 10 nm.

4. The apparatus according to claim 1, further comprising a second light coupler disposed between the distal end and the spatial light modulator.

5. The apparatus according to claim 4, wherein the second light coupler is at least one of the following:
    a) a fly-eye lens array; and
    b) a rod integrator.

6. The apparatus according to claim 1, wherein the light source comprises at least one of the following:
    a) a red light source;
    b) a green light source;
    c) a blue light source;
    d) a cyan light source;
    e) a yellow light source; and
    f) a magenta light source.

7. The apparatus according to claim 1, wherein the projection lens has a diameter configured to reduce speckle contrast in images.

8. The apparatus according to claim 1, wherein the spatial light modulators is includes at least one of the following:
    a) a digital light processing (DLP) chip;
    b) a liquid crystal on silicon (LCoS) chip; and
    c) a grating light valve (GLV).

9. The apparatus according to claim 1, wherein the multimode optical fiber is one or more step index multimode optical fibers having at least one of the following: a round cross-sectional shape, a square cross-sectional shape, an octagonal cross-sectional shape, and a rectangular cross-sectional shape.

10. The apparatus according to claim 1, wherein the multimode optical fiber is one or more gradient index multimode optical fibers.

11. The apparatus according to claim 1, wherein the multimode optical fiber is one or more liquid light guides.

12. The apparatus according to claim 1, further comprising a mode scrambler disposed near the proximal end and configured to excite modes of the multimode optical fiber.

13. The apparatus according to claim 1, further comprising a multimode optical fiber vibrator.

14. The apparatus according to claim 1, further comprising an image plane vibrator.

15. The apparatus according to claim 1, further including at least one nonlinear optical fiber disposed between the light source and the multimode optical fiber, at least one of the at least one nonlinear optical fiber configured to increase the bandwidth of the wavelength spectrum of light that enters the proximal end of the nonlinear fiber so that light which exits the distal end of the nonlinear fiber has a wavelength spectrum with 1/e half-width emission bandwidth in the range of 0.5 to 20 nm.

16. The apparatus according to claim 15, wherein at least one of the at least one nonlinear optical fiber and the multimode optical fiber are the same multimode optical fiber.

17. An apparatus comprising:
   a) at least two mutually incoherent light sources, each of the light sources illuminating a channel, and each of the light sources having a wavelength spectrum of 1/e half-width emission bandwidth in the range of 0.05 nm to 20 nm;
   b) at least two multimode optical fibers, each of the at least two multimode optical fibers:
      i) between 0.1 and 100 meters,
      ii) having a proximal end;
      iii) having distal end; and
      iv) configured to substantially emit at the distal end only the spectrum of light that enters the proximal end;
   c) a first light coupler configured to couple the proximal end of the at least two multimode optical fibers in the channel to the at least two mutually incoherent light sources in the channel; and
   d) a distal end bundle configured to hold a collection of the distal end of each of the at least two multimode optical fibers according to a spatial pattern configured to reduce speckle contrast.

18. The apparatus according to claim 17, including a spatial light modulator configured to:
   a) receive light that emerges from the distal end bundle; and
   b) modulate the received light to form an image.

19. The apparatus according to claim 17, including a projection lens to transfer light from the distal end bundle onto an image plane or object to be illuminated.

20. The apparatus according to claim 17, wherein the 1/e half-width emission bandwidth is in the range of 2 to 15 nm.

21. The apparatus according to claim 17, wherein the 1/e half-width emission bandwidth is in the range of 3 to 10 nm.

22. The apparatus according to claim 17, wherein:
   a) the at least two mutually incoherent light sources is at least two to nineteen mutually incoherent light sources; and
   b) the at least two multimode optical fibers is at least two to nineteen multimode optical fibers.

23. The apparatus according to claim 18, further comprising a second light coupler disposed between the distal end bundle and the spatial light modulator.

24. The apparatus according to claim 23, wherein the second light coupler is at least one of the following:
   a) a fly-eye lens array; and
   b) a rod integrator.

25. The apparatus according to claim 17, wherein each of the at least two mutually incoherent light sources includes at least one of the following:
   a) a red light source;
   b) a green light source;
   c) a blue light source;
   d) a cyan light source;
   e) a yellow light source; and
   f) a magenta light source.

26. The apparatus according to claim 19, wherein the projection lens has a diameter configured to reduce speckle contrast at the image plane.

27. The apparatus according to claim 18, wherein the spatial light modulators includes at least one of the following:
   a) a digital light processing (DLP) chip;
   b) a liquid crystal on silicon (LCoS) chip; and
   c) a grating light valve (GLV).

28. The apparatus according to claim 17, wherein at least one of the at least two multimode optical fibers is a step index multimode optical fiber having at least one of the following: a round cross-sectional shape, a square cross-sectional shape, an octagonal cross-sectional shape, and a rectangular cross-sectional shape.

29. The apparatus according to claim 17, wherein at least one of the at least two multimode optical fibers is a gradient index multimode optical fiber.

30. The apparatus according to claim 17, further comprising a mode scrambler disposed near the proximal end of at least one of the at least two multimode optical fibers.

31. The apparatus according to claim 17, further comprising a multimode optical fiber vibrator.

32. The apparatus according to claim 17, further including at least one nonlinear optical fiber disposes between at least one of the at least two mutually incoherent light sources and one of the at least two multimode optical fibers, each of the at least one nonlinear optical fiber configured to increase the bandwidth of the wavelength spectrum of light that enters the proximal end of the nonlinear fiber so that light which exits the distal end of the nonlinear fiber has a 1/e half-width emission is in the range of 0.5 to 20 nm.

33. The apparatus according to claim 32, wherein at least one of the at least one nonlinear optical fibers and the one of the at least two multimode optical fibers are the same optical fibers.

* * * * *